US012574801B2

(12) United States Patent
Behan et al.

(10) Patent No.: US 12,574,801 B2
(45) Date of Patent: Mar. 10, 2026

(54) OPEN RADIO ACCESS NETWORK CLOUD INTELLIGENT CONTROLLER

(71) Applicant: Dell Products L.P., Round Rock, TX (US)

(72) Inventors: Michael Behan, Athlone (IE); Anna Zakrzewska, Brackenstown (IE); Alan McNamee, Dublin (IE)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/644,310

(22) Filed: Apr. 24, 2024

(65) Prior Publication Data

US 2025/0338177 A1     Oct. 30, 2025

(51) Int. Cl.
| | |
|---|---|
| *H04W 28/16* | (2009.01) |
| *H04L 41/0681* | (2022.01) |
| *H04L 41/0866* | (2022.01) |
| *H04W 36/22* | (2009.01) |

(52) U.S. Cl.
CPC ......... *H04W 28/16* (2013.01); *H04L 41/0681* (2013.01); *H04L 41/0866* (2013.01); *H04W 36/22* (2013.01)

(58) Field of Classification Search
None
See application file for complete search history.

(56) References Cited

U.S. PATENT DOCUMENTS

| | | | | |
|---|---|---|---|---|
| 9,461,917 B1 * | 10/2016 | Liu | ................... | H04W 52/0206 |
| 10,084,925 B2 * | 9/2018 | Lim | ................... | H04L 12/1407 |

| | | | | |
|---|---|---|---|---|
| 2023/0084004 A1 * | 3/2023 | Cui | ........................ | H04W 4/50 |
| | | | | 455/434 |
| 2023/0188233 A1 * | 6/2023 | Gupta Hyde | ...... | H04B 17/3913 |
| | | | | 370/329 |
| 2023/0199519 A1 * | 6/2023 | Singh | .................... | H04W 28/16 |
| | | | | 455/414.1 |

(Continued)

FOREIGN PATENT DOCUMENTS

| | | | | |
|---|---|---|---|---|
| WO | WO-02056564 A1 * | 7/2002 | ............. | H04L 29/06 |
| WO | WO-2005029900 A1 * | 3/2005 | ............. | H04W 48/18 |
| WO | WO-2024035418 A1 * | 2/2024 | ........... | G06F 1/3287 |

*Primary Examiner* — Umar Cheema

(74) *Attorney, Agent, or Firm* — Amin, Turocy & Watson, LLP

(57)        ABSTRACT

The described technology is generally directed towards implementing a cloud intelligent controller (CIC) system at the O-Cloud platform/infrastructure to enable automated and fast (e.g., near-RT) implementation/coordination between the O-Cloud CIC and radio access network (RAN) controllers. O-Cloud-applications (cApps) are configured for implementation at the CIC, such that a workload received at the O-Cloud can be accompanied with a cApp, wherein the cApp defines the respective resources, functionality, etc., required to process the workload. Hence, rather than relying on information provided by other platforms in the RAN (e.g., service management and orchestration (SMO), non-RT RAN intelligent controller (RIC), near-RT RIC, and associated rApps and xApps), implementing a CIC with cApps enables inherent processing latency of conventional RAN configurations to be reduced, further enabling improved power control, resource management, and the like, to be performed locally at the CIC/O-Cloud.

20 Claims, 16 Drawing Sheets

(56)    References Cited

U.S. PATENT DOCUMENTS

| 2023/0413111 | A1* | 12/2023 | Kotaru | ............. | H04W 28/0858 |
| 2024/0106709 | A1* | 3/2024 | Shete | ................. | H04L 41/0895 |
| 2024/0111594 | A1* | 4/2024 | Ravindran | .......... | H04L 41/0823 |
| 2024/0214865 | A1* | 6/2024 | Mishra | ............. | H04W 28/0975 |
| 2024/0250875 | A1* | 7/2024 | Luthra | ................. | H04W 24/02 |
| 2024/0250878 | A1* | 7/2024 | Luthra | ............... | H04L 41/0894 |

* cited by examiner (Conventional O-RAN)

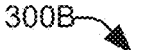
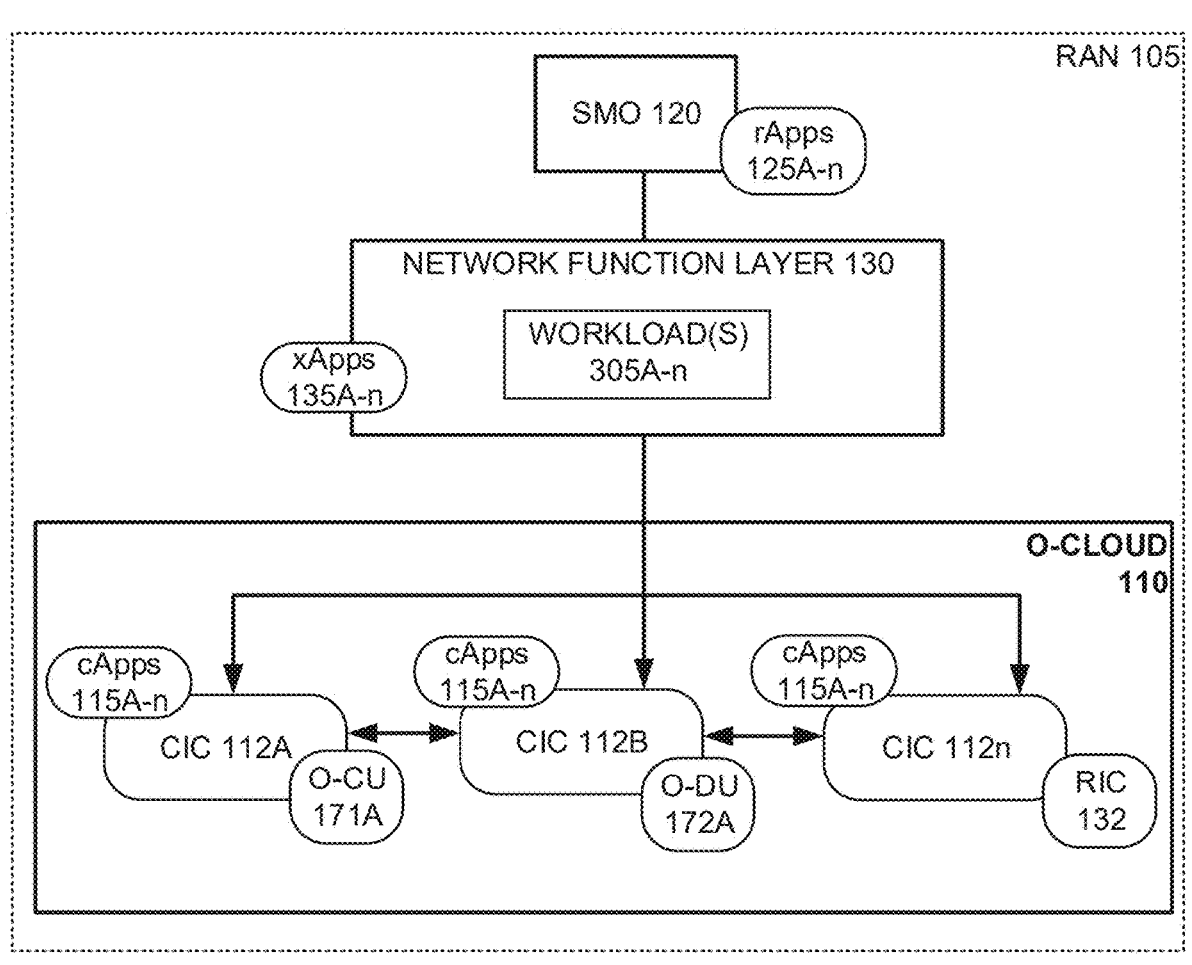
FIG. 3B

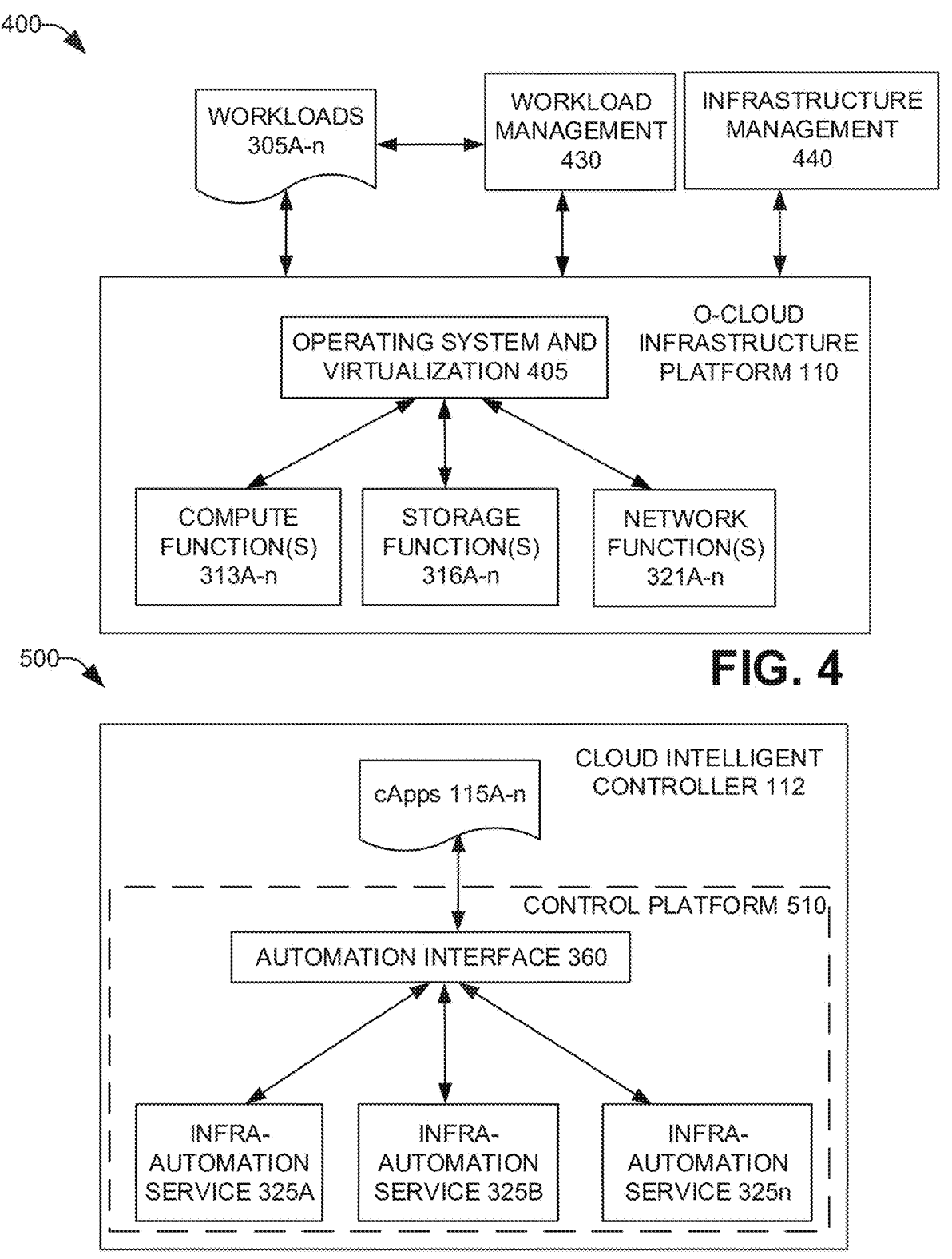

400

WORKLOADS
305A-n

WORKLOAD
MANAGEMENT
430

INFRASTRUCTURE
MANAGEMENT
440

O-CLOUD
INFRASTRUCTURE
PLATFORM 110

OPERATING SYSTEM AND
VIRTUALIZATION 405

COMPUTE
FUNCTION(S)
313A-n

STORAGE
FUNCTION(S)
316A-n

NETWORK
FUNCTION(S)
321A-n

CLOUD INTELLIGENT
CONTROLLER 112 cApps 115A-n

CONTROL PLATFORM 510

AUTOMATION INTERFACE 360

INFRA-
AUTOMATION
SERVICE 325A

INFRA-
AUTOMATION
SERVICE 325B

INFRA-
AUTOMATION
SERVICE 325n

810 — INCORPORATE CLOUD INTELLIGENT CONTROLLER IN O-CLOUD PLANE

820 — CONFIGURE CAPPS FOR IMPLEMENTATION AT CIC

900

910 — RECEIVE WORKLOAD WITH cAPP

920 — PROCESS cAPP

930 — IMPLEMENT RESOURCES FOR WORKLOAD PER cAPP

1000

1010   CIC MONITORS OPERATION OF O-CLOUD RESOURCES

1020   GENERATE cAPP CONVEYING O-CLOUD OPERATION

1030   TRANSMIT cAPP TO OTHER NODES/SYSTEM COMPONENTS

1040   INTERACT WITH OTHER NODES/SYSTEM COMPONENTS PER cAPP

1100

1110   RECEIVE WORKLOAD WITH xAPP/rAPP

1120   PROCESS xAPP/rAPP

1130   CREATE cAPP FROM THE xAPP/rAPP

1140   IMPLEMENT/DISTRIBUTE cAPP

E2 NODE POWER CONTROL

SMO DRIVEN POWER CONTROL

ROLLING INFRASTRUCTURE FIRMWARE UPDATES

INCIDENT RESPONSE

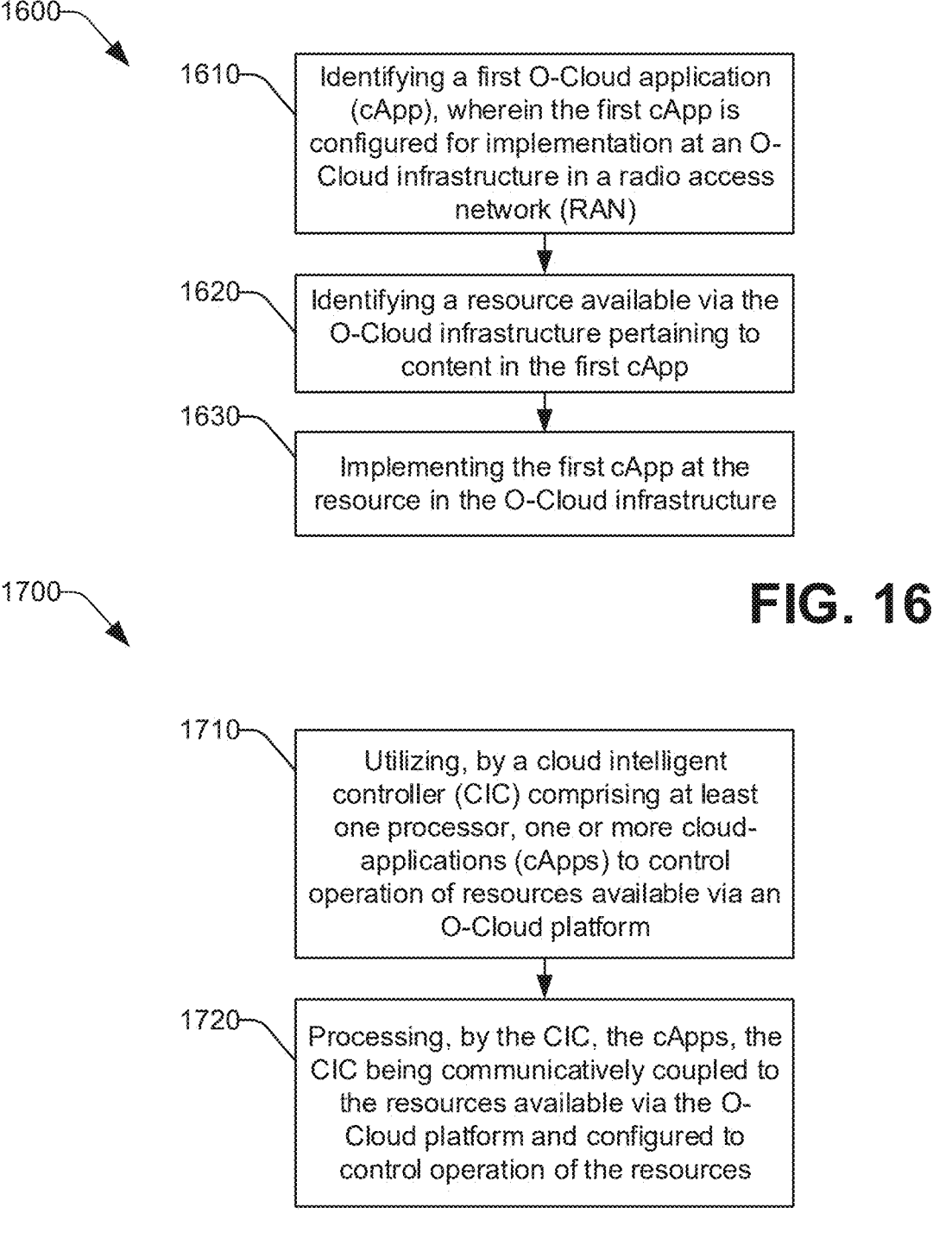

1600

1610 — Identifying a first O-Cloud application (cApp), wherein the first cApp is configured for implementation at an O-Cloud infrastructure in a radio access network (RAN)

1620 — Identifying a resource available via the O-Cloud infrastructure pertaining to content in the first cApp 1630 — Implementing the first cApp at the resource in the O-Cloud infrastructure

1710 — Utilizing, by a cloud intelligent controller (CIC) comprising at least one processor, one or more cloud-applications (cApps) to control operation of resources available via an O-Cloud platform 1720 — Processing, by the CIC, the cApps, the CIC being communicatively coupled to the resources available via the O-Cloud platform and configured to control operation of the resources

1810 — Generating a cloud-application (cApp), wherein the cApp is configured to control operation of an O-Cloud platform resource available on the O-Cloud platform 1820 — Deploying the cApp to control the operation of the O-Cloud platform resource

OPEN RADIO ACCESS NETWORK CLOUD INTELLIGENT CONTROLLER

BACKGROUND

Radio access networks (RANs) provide wide-area wireless connectivity to mobile devices. A RAN can be constructed from devices manufactured by disparate vendors. Given the potentially vast scale and complexity of RANs developed to meet the ever-increasing demand for cellular communications, various vendor consortiums have been formed with a view to generating specifications to facilitate configurations, techniques, methods, equipment, etc., for respective communications on a RAN. Such consortiums include the Third Generation Partnership Project (3GPP) incorporating Long-Term Evolution Fourth Generation (LTE 4G), Fifth Generation/New Radio (5G, 5G/NR), and most recently, the Open-Radio Access Network (O-RAN).

An impetus of O-RAN is for an open, disaggregated RAN, which can be achieved by splitting the RAN architecture, applications (e.g., xApps, rApps), and protocols into different, independent components. Disaggregation is anticipated to reduce energy consumption, improve system performance, and allow for rapid, open innovation in different components while ensuring a multi-vendor, vendor agnostic, operability network.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to monitor/control operations at an O-Cloud platform of a RAN.

According to one or more embodiments, a cloud intelligent controller (CIC) system is presented, wherein the CIC comprises at least one processor, and a memory coupled to the at least one processor and having instructions stored thereon. In response to the at least one processor executing the instructions, the instructions facilitate performance of operations, comprising identifying a first O-Cloud application (cApp), wherein the first cApp is configured for implementation at an O-Cloud infrastructure in a radio access network (RAN), further identifying a resource available via the O-Cloud infrastructure pertaining to content in the first cApp, and further implementing the first cApp at the resource in the O-Cloud infrastructure.

In an embodiment, the CIC system can be located at an O-Cloud platform comprising the O-Cloud infrastructure, wherein the CIC system is configured to control operation of the O-Cloud infrastructure, and wherein the RAN is configured according to an Open-RAN configuration.

In an embodiment, the resource is one of a compute resource, a storage resource, or a network resource. In another embodiment, the first cApp can be associated with a workload, and wherein the workload can be configured to be implemented using the resource in the O-Cloud infrastructure.

In a further embodiment, the operations can further comprise receiving an instruction, wherein the instruction can be to set the O-Cloud infrastructure into a low power mode, and in response to processing the instruction, further setting the O-Cloud infrastructure into a defined low power mode operation according to the low power mode. In an embodiment, the instruction can be received by an xApplication (xApp), wherein the xApp can be received from a near-real time RAN intelligent controller communicatively coupled to the O-Cloud infrastructure.

In a further embodiment, the operations can further comprise generating a second cApp, wherein the second cApp can indicate a first node, in the O-Cloud infrastructure, that is being placed in low power mode, and further sending the second cApp to a second node in the O-Cloud infrastructure, content of the second cApp indicating to the second node that the first node is being placed in low power mode. In a further embodiment, the operations can further comprise generating the second cApp with an instruction to the second node instructing the second node to handle any traffic handed off by the first node while the first node is in low power mode.

In another embodiment, the operations can further comprise comparing a first configuration log comprising a first group of configurations instructed to be implemented via the O-Cloud infrastructure with a second configuration log comprising a second group of configurations implemented via the O-Cloud infrastructure. The operations can further comprise, in response to determining first content of the first configuration log and second content of the second configuration log do not match, generating an alert indicating that the first content of the first configuration log and the second content of the second configuration log are disparate, and further transmitting the alert to a device associated with an entity monitoring operation of the O-Cloud infrastructure.

In other embodiments, elements described in connection with the disclosed systems can be embodied in different forms such as computer-implemented methods, computer program products, or other forms. In an embodiment, the computer-implemented method can comprise utilizing, by a cloud intelligent controller (CIC) comprising at least one processor, one or more cloud-applications (cApps) to control operation of resources available via an O-Cloud platform, and further processing, by the CIC, the cApps, the CIC being communicatively coupled to the resources available via the O-Cloud platform and configured to control operation of the resources.

In a further embodiment, the method can further comprise receiving, by the CIC, a workload from the O-Cloud platform and a cApp, of the one or more cApps, corresponding to the workload, wherein the cApp defines one or more processing specifications applicable to the workload, determining, by the CIC, based on content of the cApp, an O-Cloud resource usable to implement the workload, wherein the O-Cloud resource is included in O-Cloud resources communicatively coupled to the CIC, and implementing, by the CIC, the workload using the O-Cloud platform resource.

In a further embodiment, the method can further comprise determining, by the CIC, a first operation of a first O-Cloud resource, further generating, by the CIC, a cApp, of the one or more cApps, configured to define the first operation of the first O-Cloud resource, and further implementing, by the CIC, the cApp using a second O-Cloud resource, wherein a second operation of the second O-Cloud resource depends on the first operation of the first O-Cloud resource.

In an embodiment, wherein the first operation of the first O-Cloud resource can be to implement a low power mode and the second operation of the second O-Cloud resource can be to process a transferred workload handed off to the second O-Cloud resource while the first O-Cloud resource is in low power mode.

In a further embodiment, the method can further comprise implementing, by the CIC, a first set of operational configurations using a first O-Cloud resource and further generating, by the CIC, a first configuration log defining the first set of operational configurations to be implemented using the first O-Cloud resource. In a further embodiment, the method can further comprise generating, by the CIC, a second configuration log defining a current operating condition of the first O-Cloud resource, and further, in response to a determination that first content of the first configuration log does not match second content of the second configuration log, generating, by the CIC, an alarm indicating a disparity between the first content of the first configuration log and the second content of the second configuration log.

In an embodiment, the CIC can be communicatively coupled to a non-real time radio access network intelligent controller (RIC) incorporated into a service management and orchestration platform and a near-real time RIC configured to control operations at an O-RAN-compliant central unit (O-CU) or an O-RAN-compliant distributed unit (O-DU).

Another embodiment can further comprise a computer program product stored on a non-transitory computer-readable medium and comprising machine-executable instructions, wherein, in response to being executed, the machine-executable instructions cause a cloud intelligent controller (CIC) that can be part of an O-Cloud platform to perform operations, the operations comprising generating a cloud-application (cApp), wherein the cApp can be configured to control operation of an O-Cloud platform resource available on the O-Cloud platform, and further deploying the cApp to control the operation of the O-Cloud platform resource.

In an embodiment, the O-Cloud platform resource can be implemented at a node communicatively coupled to the O-Cloud platform.

In a further embodiment, the operations can further comprise determining a current operating condition of the O-Cloud platform resource, identifying that a prior operating condition of the O-Cloud platform resource matches the current operating condition of the O-Cloud platform resource, further identifying an operational setting of the O-Cloud platform resource that was implemented in response to the prior operating condition, and further implementing the operational setting to be applicable to the O-Cloud platform resource while the current operating condition remains.

In a further embodiment, the operations can further comprise determining content of a workload to be serviced on the O-Cloud platform, further determining, based on the content of the workload, the workload can be serviced by the O-Cloud platform resource, further generating the cApp in response to determining the workload is to be serviced by the O-Cloud platform resource, and further transmitting the workload and the cApp to the O-Cloud platform resource to facilitate servicing of the workload using the O-Cloud platform resource.

In another embodiment, the operations can further comprise generating the cApp in response to content received in one of an xApp received from a near-real time RAN intelligent controller (RIC) or an rApp received from a non-real time RIC, and implementing the cApp using the O-Cloud platform resource, wherein the O-Cloud platform resource can be one of a compute resource, a storage resource, or a network resource.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3B presents a CIC system implemented in an O-Cloud plane, in accordance with an embodiment.

FIG. 4 presents a schematic illustrating respective issues regarding management of infrastructure of a telecommunication cloud.

FIG. 5 presents a schematic illustrating a CIC configured to enable extensible automation of infrastructure resources, in accordance with an embodiment.

FIG. 16 illustrates a block flow diagram for a process associated with implementing a CIC and cApps at an O-Cloud platform, in accordance with one or more embodiments presented herein.

FIG. 17 illustrates a block flow diagram for a process associated with implementing a CIC and cApps at an O-Cloud platform, in accordance with one or more embodiments presented herein.

DETAILED DESCRIPTION

Figure 1:
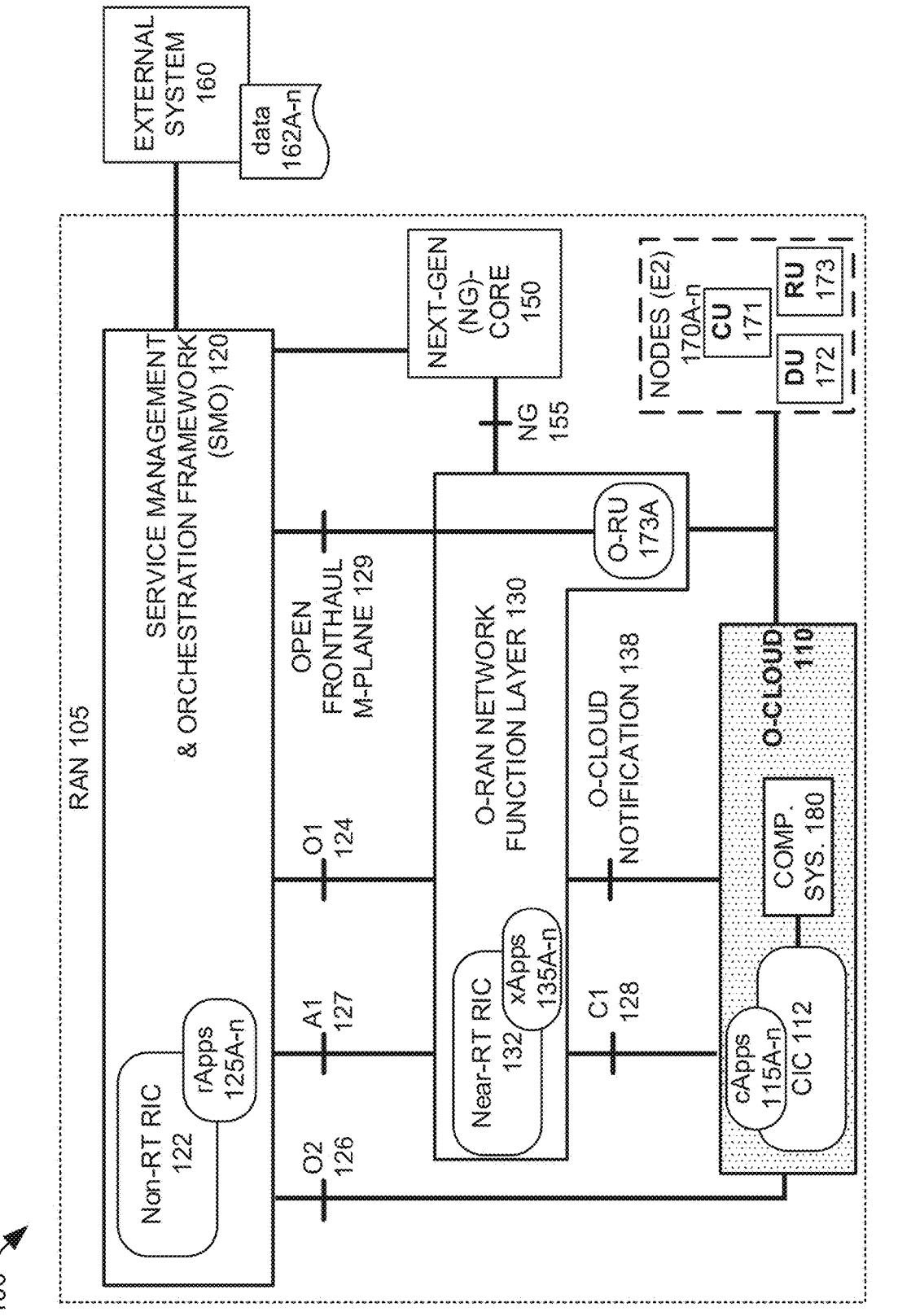
FIG. 1 presents a RAN system with an O-Cloud incorporating a CIC system and cApps implemented thereon, in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

Terms xApp/rApp: an application deployable at an O-RAN (e.g., at a RAN Intelligent Controller (RIC)) and configured to optimize/automate RAN operations/workloads in conjunction with supporting use cases directed at lowering an operator's (e.g., a mobile operator) total cost of ownership (TCO), enhancing a customer's quality of experience (QoE), and suchlike. xApps are applications implemented regarding workloads requiring near-real time (near-RT) processing/implementation (e.g., a first range of time, such as less than 1 second, between 10 milliseconds and 1 second, etc.). xApps enable near-RT optimization and control and data monitoring of CU and DU nodes in near-RT timescales. rApps are applications implemented regarding workloads that can be processed/implemented in a non-real time (non-RT) manner (e.g., a second range of time representing a greater period of time than the first time range, such as >1 s). Functions associated with rApps can include service and policy management, RAN analytics, and model training for the near-Real Time RICs, and suchlike.

cApp: also known as an O-cloud application, a cloud-application, a cloud-app, is an application deployable/implemented (e.g., with/without a workload) at the O-Cloud infrastructure/platform. Utilizing cApps enables functionalities to be distributed across the O-Cloud infrastructure/platform. cApps also enable centralized functionality. In accordance with the vendor agnostic foundation of O-RAN, cApps can be generated by multiple vendors on both public and private cloud-based networks/architectures, wherein a cApp can be configured to abstract a vendor-specific instruction/element to a common instruction for implementation on the O-Cloud layer.

Cloud Intelligent Controller (CIC): The CIC is an O-RAN component, e.g., a logical entity, configured to control and optimize functionality at the O-Cloud architecture/infrastructure, as further described herein. Numerous CICs can be implemented across the O-RAN, enabling local and distributed processing/functionality across the O-Cloud. In an embodiment, the CIC can be utilized to host the cApps.

Nodes & E2 Nodes: RAN architecture can include a range of units referred to as nodes, such as central units (CUs), distributed units (DUs), and radio units (RUs). Generally, CUs centralize RAN packet processing functions, DUs conduct baseband processing functions across cell sites, and RUs provide radio functions at antenna sites (e.g., conversion/transmission/receipt of radio signals from digital signals). While the RUs are located at antenna sites, the locations of CUs and DUs are not fixed to any particular geographic area or site. DUs can be co-located with RUs local to an antenna, also DUs can be located many miles from RUs, whereby connection between the DUs and RUs is by any suitable technology, e.g., fiber optics. CUs and DUs can be located "in the cloud", such as at a data center which may or may not be proximal to the RU.

O-cloud: an operational/architectural layer including hardware and software components providing cloud computing capabilities to execute various RAN functions. O-cloud functions/architecture can include O-DU, O-CU-CP, O-CU-UP, O-eNB, near-RT RIC, non-RT RIC, nodes (e.g., E2 nodes), and suchlike. An entity utilizing the O-Cloud can implement modeling regarding how resources are deployed/utilized in the O-Cloud, whereby resources can include, for example, a compute resource, a storage resource, a networking resource, a cloud resource, and suchlike. In an aspect, an O2 interface can be utilized to interface/access the O-Cloud from an upper-level management domain/layer (e.g., the service management and orchestration (SMO)).

RAN Intelligent Controller (RIC): The RIC is an O-RAN component configured to control and optimize RAN functions. The RIC enables O-RAN disaggregation with regard to onboarding of multi-vendor/third-party xApps/rApps to automate/optimize RAN operations, e.g., with regard to use cases that lower mobile operators' TCO, enhance customers' QoE, and suchlike. The RIC can control what xApps/rApps are deployed on a RAN. For some context, example, non-limiting Non-Real Time RIC (Non-RT RIC) functions include service and policy management, RAN analytics, and model training for the near-Real Time RICs. In this regard, the Non-RT-RIC enables non-real-time (e.g., a first range of time, such as >1 s) control of RAN elements and their resources through applications, e.g., specialized applications called xApps. Example, non-limiting Near-Real Time RIC (near-RT RIC) functions enable near-real-time optimization and control and data monitoring of CU and DU nodes in near-RT timescales (e.g., a second range of time representing less time than the first time range, such as between 10 ms and 1 s).

Service management orchestration (SMO) framework: can be configured to function as the management and orchestration layer controlling configuration and automation aspects of RIC and RAN elements. Can be further configured to handle deployment of rApps, in conjunction with a non-RT RIC.

n is any positive integer.

1. Overview

While xApps and rApps have been developed to enable respective implementation of applications/workloads in the near-RT RIC and the non-RT RIC, aspects such as energy savings (e.g., close control of CPU P-/C-states) and fault management (internal autonomous fault resolution) at the O-Cloud require internal O-Cloud automation. Existing RAN technologies/configurations do not address O-Cloud automation or programmability. Current O2 application programming interfaces (APIs), available to any authorized consumer/entity of the O2 interface (e.g., via the SMO, such as terminating at the SMO-FOCOM/NFO (SMO-Federated Open Cloud Orchestration & Management/Network Function Orchestration)), are insufficient owing to volume and time sensitivity of data to be exchanged over the O2 interface.

The various embodiments presented herein include incorporating a CIC system at the O-Cloud, to enable, in a non-limiting list:

(a) distribution of infrastructure and cloud environment automation functionality.

(b) implementation of an interface for near-RT O-Cloud automation use cases.

(c) provision of a platform for O-Cloud customization & extensibility.

Incorporating and/or implementing a CIC system into the O-Cloud platform/infrastructure expands currently available control capabilities of O-Cloud resources, enabling autonomous configuration and monitoring at the O-Cloud level.

The various embodiments presented herein relate to implementing a cloud intelligent controller (CIC) to facilitate operation at the O-Cloud infrastructure/platform in an O-RAN system. Applications for deployment at the CIC are presented herein, entitled O-cloud-applications, cApps, further extending the functionality of presently available xApps and rApps. While xApps and rApps have been developed to extend the concept/functionality of an O-RAN system, xApps and rApps are respectively implemented on the near-real time (near-RT) RAN intelligent controller (RIC) and non-real time (non-RT) RIC.

In this regard, for some additional context, some example differentiating considerations with respect to near-RT RICs, and non-RT RICs are as follows. Example, non-limiting non-RT RIC functions include service and policy management, RAN analytics, and model training for the near-RT RICs. For instance, the non-RT RIC enables non-real-time (e.g., a first range of time, such as >1 second) control of RAN elements and their resources through applications, e.g., specialized applications called rApps. Example, non-limiting near-RT RIC functions enable near-real-time optimization and control and data monitoring of O-RAN Central Unit (O-CU) and O-RAN Distributed Unit (O-DU) nodes in near-RT timescales (e.g., a second range of time representing less time than the first time range, such as between 10 milliseconds and 1 second). In this regard, the near-RT RIC controls RAN elements and their resources with optimization actions that typically take about 10 milliseconds to about one second to complete, although different time ranges can be selected. The near-RT RIC can receive policy guidance from the non-RT RIC and can provide policy feedback to the non-RT RIC through specialized applications called xApps. Further, an RT RIC is designed to handle network functions at real time timescales (e.g., a third range of time representing less time than the first time range and the second time range, such as <10 milliseconds).

In a conventional O-RAN system architecture, implementation of workloads on the O-Cloud, the respective operations, resource usage, etc., is largely inferred from content/ deployment of the respective xApps and rApps. Such inference can limit the operation/implementation of workloads on the O-Cloud. The CIC can function as an interface between any of the SMO, non-RT-RIC, near RT-RIC, and an O-Cloud infrastructure. Accordingly, the various embodiments presented herein enable the O-Cloud to be considered, and function, as an intelligent platform.

By utilizing a CIC, in conjunction with cApps specifically designed for/implemented by the CIC, in a non-limiting list, the following benefits are engendered versus both legacy systems and also conventional, non-CIC/cApp, systems:

(a) extensible and customizable O-Cloud infrastructure control-plane with policy provisioning and execution by the CIC.

(b) fast (e.g., <10 ms) coordination between O-Cloud CIC and RAN controllers (e.g., near-RT controllers). Enables creation of Open/O-RAN systems having capabilities, processing speeds, etc., comparable to the capabilities of legacy RAN equipment, e.g., where vendor specific systems utilized vendor specific applications that were typically incompatible with other-vendor designed systems, but enabled high processing speeds within a vendor-proprietary domain.

(c) enables implementation of 3rd party CIC cApps. Accordingly, an O-RAN system can evolve from the basic capabilities with minimal architecture impact. Such vendor agnostic evolution is not available with a legacy system comprising vendor-specific/proprietary components.

(d) distributable deployment architecture. Flexible deployment of CIC services/cApps across near-edge and far-edge locations across multiple RAN sites/locations. Accordingly, intelligence/knowledge regarding implementation/operation of O-Cloud resources can be distributed throughout the O-Cloud infrastructure and available local to a respective node. Near-edge relates to where applications such as an O-CU of a 5G core/ network could be deployed. Far-edge can denote a distance of ~20 kilometers for a cell tower. A cell tower may have a limited number of nodes/data servers at a far edge location, which can make it difficult for a legacy system to provide local functionality such as analytics/automation. However, per the various embodiments presented herein, virtualization and generic infrastructure at the far edge provides greater intelligence for customers/users. Accordingly, while in an embodiment, a CIC can function as a centralized system, in a further embodiment, multiple CICs may be implemented across an O-RAN, and in another embodiment, a single CIC could host multiple logical CIC's, e.g., in a multi-tenancy configuration. The number and configuration of CIC's implemented across an O-Cloud infrastructure is flexible in accordance with structural and functional changes/requirements placed on/at the O-Cloud. Accordingly, two or more CICs can be configured to interface with themselves to enable distribution of knowledge between various CICs, whereby the knowledge can pertain to workload implementation, resource utilization, etc. For example, such shared knowledge enables failover operations sharing a software image(s) for a workload and a runtime configuration of the platform, a CIC to undergo an energy saving mode with a workload(s) distributed/offloaded to other CICs, implementing a new/replicating O-Cloud infrastructure utilizing knowledge engendered from the cApps, traffic steering between cell towers/areas, and suchlike.

(e) removes slow-loop burden of full O-Cloud management & control from SMO. Conventional architecture requires domain knowledge of both radio networks and cloud infrastructure in a single management system, e.g., the data/knowledge is sent northbound from the O-Cloud to the SMO (while southbound indicates data/knowledge transfer from the SMO to the O-Cloud/ edge nodes. By enabling the data/knowledge to be retained/processed at the CIC-implemented O-Cloud, distributed and fast coordination of workload implementation is available, rather than having to utilize the SMO, and the inherent processing latency arising therefrom.

In terms of use cases, the various embodiments can be used in a variety of scenarios/use cases, including:

(a) infrastructure automation—general purpose & domain specific resource automation.

(b) power efficiency control-policy based electrical operating expense (OPEX) management/optimization facilitating power savings/cost reduction of implementing the O-RAN.

(c) security incident automation-extensible policy-driven incident detection and response being fast in nature to protect both the workloads and users of the workloads (such as mobile subscribers and other industry users such as retail, finance, etc.).

(d) deployment and life cycle management (LCM) optimization-placement optimization, upgrade customization, owing to the workloads being optimally deployed rather than relying on long lead time planning where measurements are taken and analyzed out of band (e.g., outside of any primary communication channel), where new deployment or updated deployment/configuration is planned and then onboarded into the system, such approaches with a legacy/conventional system can take several months.

(e) transport optimization, where transport can relate to internet protocol (IP) networks linking various sites/ components/entities and applications across the O-RAN.

(f) multicloud coordination-coordinate with external/public infrastructure services communicatively coupled to the O-RAN system.

2. CIC/O-Cloud Architecture

FIG. 1, system 100, presents a RAN system with an O-Cloud incorporating a CIC system and cApps implemented thereon, in accordance with one or more embodiments. As shown, an O-Cloud platform 110 (e.g., architecture, plane, infrastructure, and suchlike) is operating on/incorporated into a RAN system 105 in conjunction with a service management and orchestration (SMO) framework 120 and an O-RAN network function(s) layer 130.

O-Cloud platform 110, SMO 120, and network function layer 130 can be respectively referred to/represent network architecture, plane, infrastructure, and suchlike. The RAN 105 can include various nodes 170 (e.g., E2 nodes), for example one or more of a CU 171A-n, DU 172A-n, and a RU 173A-n, and also cell towers, network interfaces, and other infrastructure (not shown) to facilitate respective communications (e.g., 3G, 4G, 5G, O-RAN, etc.).

In accordance with an embodiment, a CIC system 112 can be implemented on the O-Cloud platform 110, in conjunction with cApps 115. CIC 112 can be implemented on/communicatively coupled to a computer system 180, as further described. In an aspect, the O-cloud platform 110 is an infrastructure layer configured to coordinate functions for the RAN 105, SMO 120, the non-RT RIC 122, and near-RT RIC 132

As further shown, a non-RT RIC 122 can be implemented at SMO 120, operating in conjunction with rApps 125A-n. A near-RT RIC 132 can be utilized to operate the O-RAN network function layer 130 in conjunction with xApps 135A-n, wherein the O-RAN network function layer 130 can further include an O-RU 173A. SMO 120 can be connected to the O-RAN network function layer 130 via A1 interface 127, O1 interface 124, and/or open fronthaul M-plane 129. SMO 120 can be further connected to the O-Cloud platform 110 layer via the O2 interface 126. O2 interface 126 enables infrastructure management service (IMS) and deployment management service (DMS) to be implemented between SMO 120 and O-Cloud platform 110.

Further, the O-RAN network function layer 130 can be connected to the O-Cloud platform 110 layer via interfaces C1 128 and/or O-Cloud notification layer interface 138, wherein C1 128 connects controllers at the radio layer and the O-Cloud layer. The O-RAN network function layer 130 can be communicatively coupled to a Next Generation RAN core 150 (aka NG-CORE) via a NG interface 155. An external system 160 can be communicatively coupled to SMO 120, wherein, as further described herein, external system 160 can also be configured to interact with/access O-Cloud platform 110. In an aspect, external system 160 can be providing enrichment data 162A-n to the SMO 120.

It is to be appreciated that while FIG. 1 illustrates cApps 115A-n being processed by a CIC 112 located at the O-Cloud platform 110, implementation of the CIC 112 and cApps 115A-n is not so limited. CIC 112 and cApps 115A-n, while utilized to manage workloads (e.g., workloads 305A-n) running in the O-Cloud platform 110, the CIC 112 and cApps 115A-n do not have to run in the O-Cloud platform 110, rather, the CIC 112 and cApps 115A-n can run in any cloud in RAN 105 or other form of compute resource.

Figure 2:
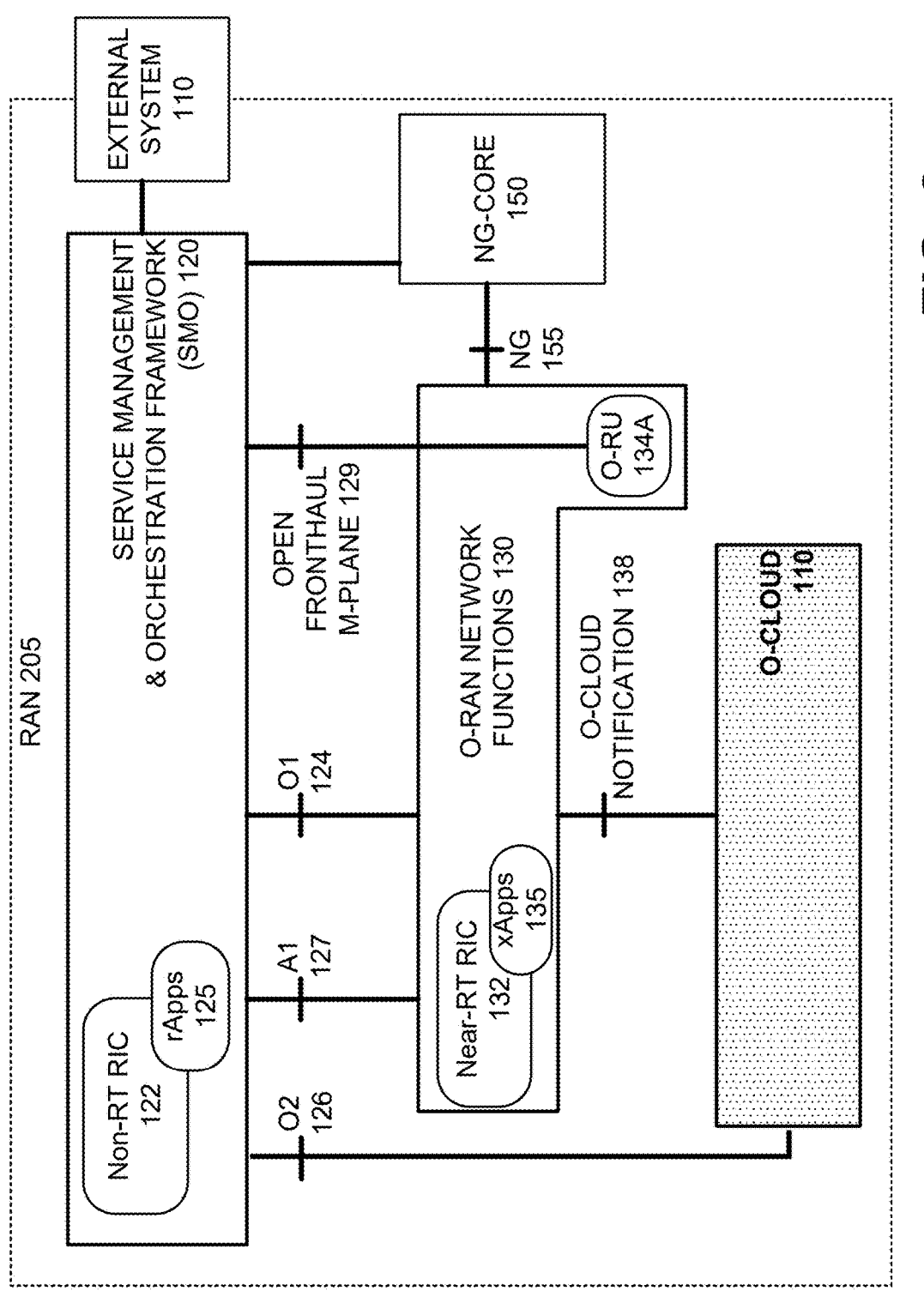
FIG. 2 presents a conventional O-RAN.

Turning momentarily to FIG. 2, system 200 presents a conventional O-RAN 205. Comparing FIG. 1 and FIG. 2, the O-CLOUD platform 110 of the conventional O-RAN system 205 does not include the CIC 112, the cApps 115, or the C1 interface 128 connecting the O-RAN network function layer 130 to the O-Cloud platform 110.

Figure 3A:
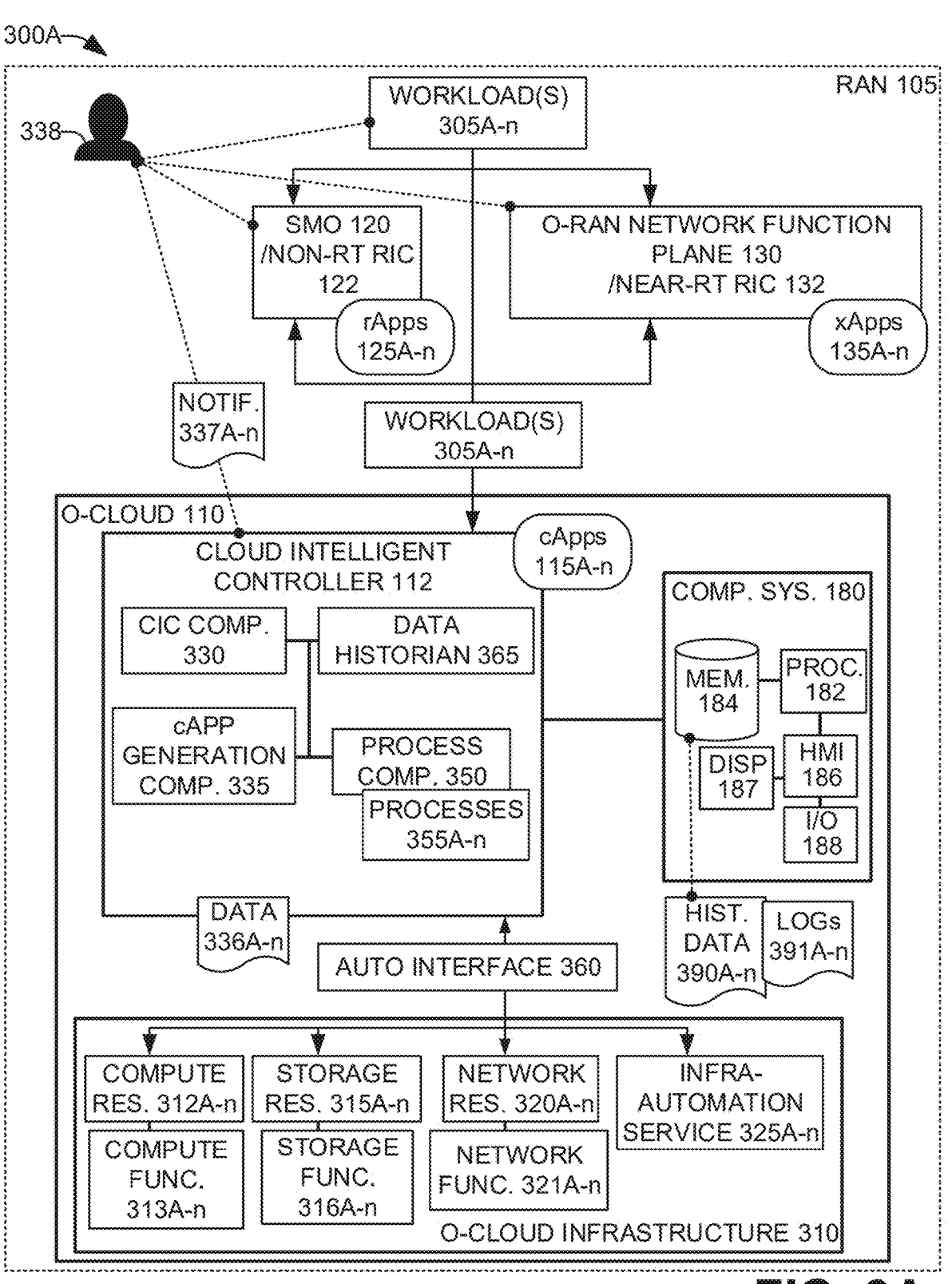
FIG. 3A presents a CIC system implemented in an O-Cloud plane, in accordance with an embodiment.

FIG. 3A, system 300A, presents a CIC system implemented in an O-Cloud plane, in accordance with an embodiment.

As shown, O-Cloud platform 110 is communicatively coupled/accessible by SMO 120 (with the non-RT RIC 122 implemented thereon) and the network function plane 130 (with the near-RT RIC 132 implemented thereon). Respective workloads 305A-n can be implemented on the SMO 120 and network function plane 130, in conjunction with rApps 125A-n and xApps 135A-n. Workloads 305A-n can also be implemented directly to the O-Cloud platform 110, with associated cApps 115A-n.

O-Cloud platform 110 can include an infrastructure 310 where various resources are available for implementation/ servicing of workloads 305A-n. Available resources include compute resources 312A-n, storage resources 315A-n, and network resources 320A-n. As previously mentioned, O-Cloud platform 110 can further include a CIC 112. CIC 112 can further include a CIC component 330, and a cApp generation component 335. Data/information 336A-n generated during operation of the CIC 112/CIC component 330, cApps 115A-n, etc., can be compiled/generated by the CIC 112 and associated components, and transmitted throughout the RAN 105, e.g., as required to facilitate implementation of the cApps 115A-n, processing of workloads 305A-n, etc., at the O-Cloud platform 110.

As previously mentioned, the CIC component 330 can be configured to process and implement one or more cApps 115A-n to control/monitor operation of one or more elements of an O-Cloud platform 110/O-Cloud infrastructure 310, control/monitor operation of one or more resources (e.g., compute resources 312A-n (e.g., processor 182), storage resources 315A-n (e.g., memory 184), network resources 320A-n, and suchlike), process xApps 135A-n received from a near-RT RIC 132, process rApps 125A-n received from a non-RT RIC 122, and suchlike. In an embodiment, CIC component 330 can be configured to process/implement cApps 115A-n, e.g., in conjunction with an associated workload 305A-n. In another embodiment, a first CIC component 330A can be configured to process a cApp 115A received from a second CIC component 330B, whereby the cApp 115A was generated by the second CIC component 330B. In an example scenario, a workload 305A to be processed at a first O-RU 134A can be forwarded for processing at a second O-RU 134B, whereby the workload 305A is accompanied with a cApp 115A generated by the second CIC component 330B instructing the first CIC component 330A to process the workload 305A as the first CIC component 330A is going to low power mode.

In an aspect, while any of CIC 112, CIC component 330, cApp generation component 335, process component 350, and data historian 365, can be configured to generate respective notifications 337A-n (e.g., instructions, requirements, alarms, alerts, configurations, and suchlike), the cApps 115A-n can be configured to function in a similar manner, whereby a cApp 115A can be generated and forwarded from a first CIC 112A to a second CIC 112B, with the content of cApp 115A providing the same functionality as a notification 337A-n.

CIC 112 can be configured to control operation of one or more nodes 170A-n, whereby, CIC 112 can implement respective configurations (e.g., included in a cApp 115A-n) at the respective node 170A-n. As further described, CIC component 330 can be further configured to compare respective configurations implemented at the one or more nodes 170A-n, whereby CIC component 330 can be configured to compare a first configuration log 391A (e.g., comprising configurations instructed to be implemented by CIC component 330) with a second configuration log 391B (e.g., comprising configurations implemented at the node 170A, regardless of the source of the configurations), to determine whether the nodes 170A-n are performing as expected.

The cApp generation component 335 can be configured to generate respective cApps 115A-n, wherein the cApps 115A-n can be configured with content regarding a specific action to be performed, e.g., a first workload 305A includes data to be stored in storage resource 315A, a second workload 305B includes a data packet to be processed by compute resource 312A, a network resource 320A is being placed in low power mode and a cApp 115X is generated to inform respective portions of the RAN 105 of the low power operation (e.g., traffic hand off is to be performed), and suchlike. Further, the cApp generation component 335 can be utilized to generate one or more cApps 115A-n based on content received in an xApp 135A-n (e.g., received from near-RT RIC 132), in an rApp 125A-n (e.g., received from a non-RT RIC 122). Accordingly, content, requirements, data/information 336A-n, etc., present in xApps 135A-n and/or rApps 125A-n can be readily implemented/made available to one or more resources (e.g., compute resource

312A-n, storage resource 315A-n, network resource 320A-n) at the O-Cloud infrastructure 310. Hence, as previously mentioned, the respective abilities for a vendor/administrator 338 to interact with their specific devices/systems in a pre-O-RAN architecture can be extended/made available in the O-Cloud infrastructure 310 (e.g., with the cApps 115A-n providing abstracted functionality of the vendor specific function(s)).

The infrastructure automation services 325A-n can be accessed via an automation interface 360, and can provide services such as infrastructure orchestration at O-Cloud platform 110, policy implementation at O-Cloud platform 110, operation monitoring at O-Cloud platform 110, and suchlike.

CIC 112 can further include a data historian 365 configured to compile data 336A-n (e.g., prior and/or current data/information/knowledge) regarding operation of RAN 105 and respective components included therein, e.g., O-Cloud platform 110, O-Cloud infrastructure 310, CIC 112 and included component, generation/implementation of cApps 115A-n, with regard to operation of SMO 120, O-RAN network plane 130, and suchlike.

CIC 112 can further include a process component 350 and processes 355A-n. In an embodiment, processes 355A-n can be utilized for telemetry-based understanding of usage of the respective elements of an O-Cloud platform 110, e.g., by multiple customers/vendors/administrators utilizing the RAN. Respective usage information/data/patterns 336A-n can be utilized to train processes 355A-n with regard to such aspects as proactively scaling in or scaling out one or more E2 nodes 170/clusters of E2 nodes 170A-n. Such as, for example, processes 355A-n can be utilized by CIC component 330 to predict, based on prior resource usage trends, whether additional E2 nodes 170 are to be brought online for a specific duration or whether the E2 nodes 170 can be placed in a low-power state (e.g., at night, at weekends, etc.). In another example, processes 355A-n can be utilized to monitor a particular portion/aspect of the RAN, such that, for example, as an O-Cloud infrastructure 105 is being modified, processes 355A-n compile and analyze modification/implementation data 336A-n, with the data 336A-n being further implemented when another, disparate portion of the RAN is being modified (e.g., a second O-Cloud infrastructure 310B comparable to the first, modified O-Cloud infrastructure 310A), respective steps involved in modifying the initial O-Cloud infrastructure 130A (e.g., comprising data 336A-n, stored in historical data 390A-n) can be applied during the modification of the additional O-Cloud infrastructure 130B.

As further shown, CIC 112 can be communicatively coupled to/include a computer system 180. Computer system 180 can include a memory 184 that stores the respective computer executable components (e.g., CIC component 330, cApp generation component 335, data historian 365, and suchlike), and further, a processor 182 configured to execute the computer executable components stored in the memory 184. Memory 184 can further be configured to store any of workloads 305A-n, cApps 115A-n, rApps 125A-n, xApps 135A-n, compute functionality 313A-n, storage functionality 316A-n, network functionality 321A-n, prior/current operational history of infrastructure automation services 325A-n, prior/current operational history of E2 nodes 170, prior/current operational history of SMO 120, prior/current operational history of the O-RAN network layer 130, data 336A-n, notifications 337A-n, historical data 390A-n, similarity indexes $S_{1-n}$, vectors Vn, and suchlike (as further described herein). The computer system 180 can further include a human machine interface (HMI) 186 (e.g., a display, a graphical-user interface (GUI)) which can be configured to present various information including workloads 305A-n, cApps 115A-n, rApps 125A-n, xApps 135A-n, compute functionality 313A-n, storage functionality 316A-n, network functionality 321A-n, prior/current operational history of infrastructure automation services 325A-n, prior/current operational history of E2 nodes 170, prior/current operational history of SMO 120, prior/current operational history of the O-RAN network 105, data 336A-n, notifications 337A-n, historical data 390A-n, configuration logs 391A-n, similarity indexes $S_{1-n}$, vectors Vn, and suchlike, (as further described) per the various embodiments presented herein. HMI 186 can include an interactive display/screen 187 to present the various information. Computer system 180 can further include an I/O component 188 to receive and/or transmit respectively workloads 305A-n, cApps 115A-n, rApps 125A-n, xApps 135A-n, notifications 337A-n, node configurations in a cApp 115A-n, and suchlike. Any suitable technology can be utilized for interaction/communication by I/O 188, e.g., file transfer protocol (FTP), simple radio standalone (SRS), and suchlike.

As mentioned, CIC 112 can include a process component 350 and processes 355A-n. It is to be appreciated that processes 355A-n can comprise any artificial intelligence/machine learning (AI/ML) model/technology/technique/architecture utilized to automatically monitor/control operation of O-Cloud platform 110/O-Cloud infrastructure 310, automatically generate/process cApps 115A-n, rApps 125A-n, xApps 135A-n, automatically process/implement workloads 305A-n, further automatically interact with SMO 120/non-RT RIC 122 and O-RAN network function plane 130/near-RT RIC 132, further interact with/control operation of one or more E2 nodes 170, and further automatically update and utilize information/data 336A-n available in historical data 390A-n. Process component 350 can be utilized to implement processes 355A-n in conjunction with any of the other components included in CIC 112, O-Cloud platform 110, and/or O-Cloud infrastructure 310, e.g., CIC component 330, cApp generation component 335, compute resources 312A-n/compute functions 313A-n, storage resources 315A-n/storage functions 316A-n, network resources 320A-n/network functions 321A-n, and suchlike.

It is to be appreciated that the various processes 355A-n and operations presented herein are simply examples of respective AI and ML operations and techniques, and any suitable technology can be utilized in accordance with the various embodiments presented herein. Processes 355A-n can be based on cApps 115A-n, rApps 125A-n, xApps 135A-n, compute resources 312A-n, storage resources 315A-n, network resources 320A-n, and suchlike. In an example embodiment, processes 355A-n can include a vector component to apply any suitable vectoring technology, such as bag of words (BOW) text vectors, Euclidean distance, cosine similarity, etc. Other suitable AI/ML technologies that can be applied can include, in a non-limiting list, any of vector representation via term frequency-inverse document frequency (tf-idf) capturing term/token frequency in the respective prior/current/future workload 305A-n, cApps 115A-n, rApps 125A-n, xApps 135A-n, neural network embedding layer vector representation of terms/categories (e.g., common terms having different tense), a transformer neural network, bidirectional and auto-regressive transformer (BART) model architecture, a bidirectional encoder representation from transformers (BERT) model, long short term memory network (LSTM) operation(s), a sentence state LSTM (S-LSTM), a deep learning algorithm, a sequential neural network, a sequential neural network that enables persistent information, a recurrent neural network (RNN), a convolutional neural network (CNN), a neural network, capsule network, a machine learning algorithm, a natural language processing (NLP) technique, sentiment analysis, bidirectional LSTM (BiLSTM), stacked BiLSTM, and suchlike. Accordingly, in an embodiment, implementation of the CIC 112, CIC component 330, cApp generation component 335, and suchlike, with processes 355A-n, enables natural language processing (NLP) (e.g., utilizing vectors) to be implemented to generate and utilize a cApp(s) 115A-n.

Language models, LSTMs, BARTs, etc., can be formed with a neural network that is highly complex, for example, comprising billions of weighted parameters. Training of the language models, etc., can be conducted, e.g., by process component 350, with datasets, whereby the datasets can be formed using any suitable technology, such as content of workloads 305A-n, cApps 115A-n, rApps 125A-n, xApps 135A-n, compute resources 312A-n/compute functionality 313A-n, storage resources 315A-n/storage functionality 316A-n, network resources 320A-n/network functionality 321A-n, operation of infrastructure automation services 325A-n, operation of E2 nodes 170, operation of SMO 120, operation of the O-RAN network layer 130, data 336A-n, notifications 337A-n, historical data 390A-n, configuration logs 391A-n, and suchlike. The cApps 115A-n, workloads 305A-n, etc., can be available from many sources, e.g., prior implementation of a workload 305A-n, cApp 115A-n, rApp 125A-n, xApp 135A-n, a configuration of an E2 node 170, and suchlike, as well as provided by an administrator/operator 338 of the O-RAN system, and suchlike, to generate cApps 115A-n and implementation of cApps 115A-n.

Fine-tuning of a process 355A-n can comprise application of a current/prior workloads 305A-n, cApps 115A-n, rApps 125A-n, xApps 135A-n, compute functionality 313A-n, storage functionality 316A-n, network functionality 321A-n, operation of infrastructure automation services 325A-n, operation of E2 nodes 170, operation of SMO 120, operation of the O-RAN network layer 130, data 336A-n, notifications 337A-n, historical data 390A-n, configuration logs 391A-n, and suchlike, to the process 355A-n, process 355A-n is correspondingly adjusted by application of the current/prior cApps 115A-n, workloads 305A-n, and suchlike, such that, for example, weightings in the process 355A-n are adjusted by application of the current/prior cApps 115A-n, workloads 305A-n, and suchlike.

During application of processes 355A-n, vector representations V1-n can be applied to any of prior and current workloads 305A-n, cApps 115A-n, rApps 125A-n, xApps 135A-n, compute functionality 313A-n, storage functionality 316A-n, network functionality 321A-n, operation of infrastructure automation services 325A-n, operation of E2 nodes 170, operation of SMO 120, operation of the O-RAN network layer 130, and suchlike, such that vector similarity operations (e.g., vector clustering/distancing) can be applied to generate a future cApp 115A-n from the accrued prior knowledge regarding generation and implementation of prior workloads 305A-n, cApps 115A-n, etc. The degree of similarity (e.g., via similarity indexes $S_{1-n}$) between respective information can be determined, for example, based on a threshold reflecting a proximity of a first vector generated from information pertaining to a current cApp 115A-n, workload 305A-n, etc., and a second vector generated from information pertaining to a prior cApp 115A-n, workload 305A-n, enabling ranking of similarity, e.g., via vector quantization.

It is to be appreciated that CIC 112, CIC component 330, cApp generation component 335, compute resources 312A-n, storage resources 315A-n, network resources 320A-n, data historian 365, and process component 350, can function as separate components/implemented independently, the respective components and functionality can be combined into a single component, such as CIC component 330 operating as a single, high-level component, with one or more of cApp generation component 335, compute resources 312A-n, storage resources 315A-n, network resources 320A-n, data historian 365, and process component 350, operating as a sub-component of CIC component 330.

FIG. 3B, system 300B, presents a network of CIC systems implemented across an O-Cloud plane, in accordance with one or more embodiments.

System 300B presents an example RAN 105 comprising an O-CU 171, an O-DU 172, and a RIC 132, whereby each of the O-CU 171, an O-DU 172, and a RIC 132 has an associated CIC 112A-n located and operating locally therewith. O-CU 171, O-DU 172, RIC 132, and CICs 112A-n can be included in the O-Cloud infrastructure 110, and communicatively coupled to the network function layer 130 and the SMO 120. Workloads 305A-n can be implemented at the SMO 120, network function layer 130 (as shown), and on any of O-CU 171, O-DU 172, RIC 132. As previously mentioned, the CICs 112A-n can be configured to process/implement the workloads 305A-n in accordance with xApps 135A-n, rApps 125A-n, and also with cApps 115A-n. The CICs 112A-n can also be communicatively coupled, such that a CIC 112A (e.g., a first CIC 112A-n) can be communicating directly with CIC 112B and/or CIC 112n, such that a cApp 115A generated/implemented at CIC 112A can be forwarded to/shared with CICs 112B and 112n, e.g., without the inherent delay of transmitting a communication/instruction via the network function layer 130 and/or the SMO 120. Accordingly, any knowledge/data/information 336A-n generated/obtained/derived from implementing a cApp 115A-n (and associated workload 305A-n) can be utilized/deployed between the CICs 112A-n, which as previously described, imparts a higher level/processing of operation at the CICs 112A-n than can be obtained via a conventional system (e.g., per FIGS. 2 and 4). A number of CICs 112A-n implemented across the RAN 105 is unlimited, e.g., each node 170A-n can have an associated CIC 112A-n operating locally thereon/thereto.

3. Current Issues With Telecommunication Cloud Infrastructure Management

FIG. 4, schematic 400, illustrates respective issues regarding management of infrastructure of a telecommunication cloud. As illustrated in FIG. 4, workloads 305A-n are being implemented on an O-Cloud platform 110, with workload management 430 and infrastructure management 440 being performed external to the O-Cloud platform 110. Accordingly, an operating system (OS) 405 of O-Cloud platform 110 and according to virtualized configuration of the O-Cloud platform 110 means that any functionality of the workloads 305A-n, (e.g., compute functionality 313A-n, storage functionality 316A-n, network functionality 321A-n, and suchlike) is not inherently exposed for operation of the O-Cloud platform 110 and the workloads 305A-n implemented thereon.

As shown, optimization of workload-consumed infrastructure resources can only be performed indirectly, per the following:

(a) owing to virtualization of a RAN 105, RAN applications/workloads 305A-n are unable to directly influence the O-Cloud platform 110 and the platform resources (e.g., compute functionality 313A-n, storage functionality 316A-n, network functionality 321A-n, and suchlike) upon which the RAN applications/workloads 305A-n are run/deployed/implemented. Virtualization of the RAN 105 has removed interfacing between a RAN workload 305A-n and the O-Cloud platform 110/platform resource 313A-n/316A-n/321A-n that was available with pre-O-RAN configurations.

(b) owing to a lack of ability for introspection of a workload 305A-n, the O-Cloud platform 110 can only interpret a workload 305A-n based on generic observation of behavior of a workload 305A-n provided by separate managers 430, 440, and suchlike. Hence, considerations such as CPU utilization, memory usage, network usage, network bandwidth usage, and suchlike at O-Cloud platform 110 can only be provided by/inferred from generic measurements.

(c) the foregoing issues lead to indeterministic control & feedback at the RAN 105.

Furthermore, infrastructure management is composed of multiple/independent vendors and third-party services, e.g., for workload/system integration, which can give rise to any of the following:

(a) system integration issues when attempting to incorporate disparate, vendor-specific devices/architecture;

(b) non-standard interfaces being implemented during application of vendor-proprietary devices/systems;

(c) suboptimal deployment processes resulting from operational conflict between disparate devices/operating systems.

4. Extensible Automation of Infrastructure Resources

FIG. 5, schematic 500, illustrates a CIC configured to enable extensible automation of infrastructure resources, in accordance with an embodiment. As shown in FIG. 5 (and also in FIGS. 1, 3A, and 3B), infrastructure management at an O-Cloud platform 110 has been redefined, with implementation of a CIC 112 at the O-Cloud platform 110 to facilitate implementation of intelligent decision-making to be performed (e.g., by CIC 112) at the O-Cloud platform 110. As shown, CIC 112 can be configured to include one or more infrastructure automated services 325A-n.

CIC 112 can include a control platform 510, wherein the control platform 510 can include respective infrastructure automation services 325A-n configured to directly manage infrastructure resources 312A-n, 315A-n, 320A-n, and suchlike, at the O-Cloud platform 110. The automation services 325A-n can be accessed via an automation interface 360, and can provide services such as infrastructure orchestration at O-Cloud platform 110, policy implementation at O-Cloud platform 110, operation monitoring at O-Cloud platform 110, and suchlike.

As previously mentioned, cApps 115A-n can comprise user-defined automation applications, which can be provided by any of an independent vendor, an administrator 338 of the control platform 510/CIC 112, and suchlike. In an embodiment, cApps 115A-n can provide a degree of abstraction of properties/functions that enables the respective administrators/vendors 338 to access/interact the O-Cloud platform 110.

Accordingly, the infrastructure automation services 325A-n can be exposed through automation interface 360 (e.g., an application programming interface (API) layer).

cApps 115A-n can extend vendor-defined management of the O-Cloud platform 110 infrastructure, whereby developers of cApps 115A-n can program cApps 115A-n to deploy/implement/access the infrastructure automation services 325A-n to customize platform management of O-Cloud platform 110 in accordance with one or more requirements of a workload 305A-n, e.g., to suit requirements of a vendor/user/operator/administrator 338.

5. CIC Interfacing With an External System

Figures 6, 7:
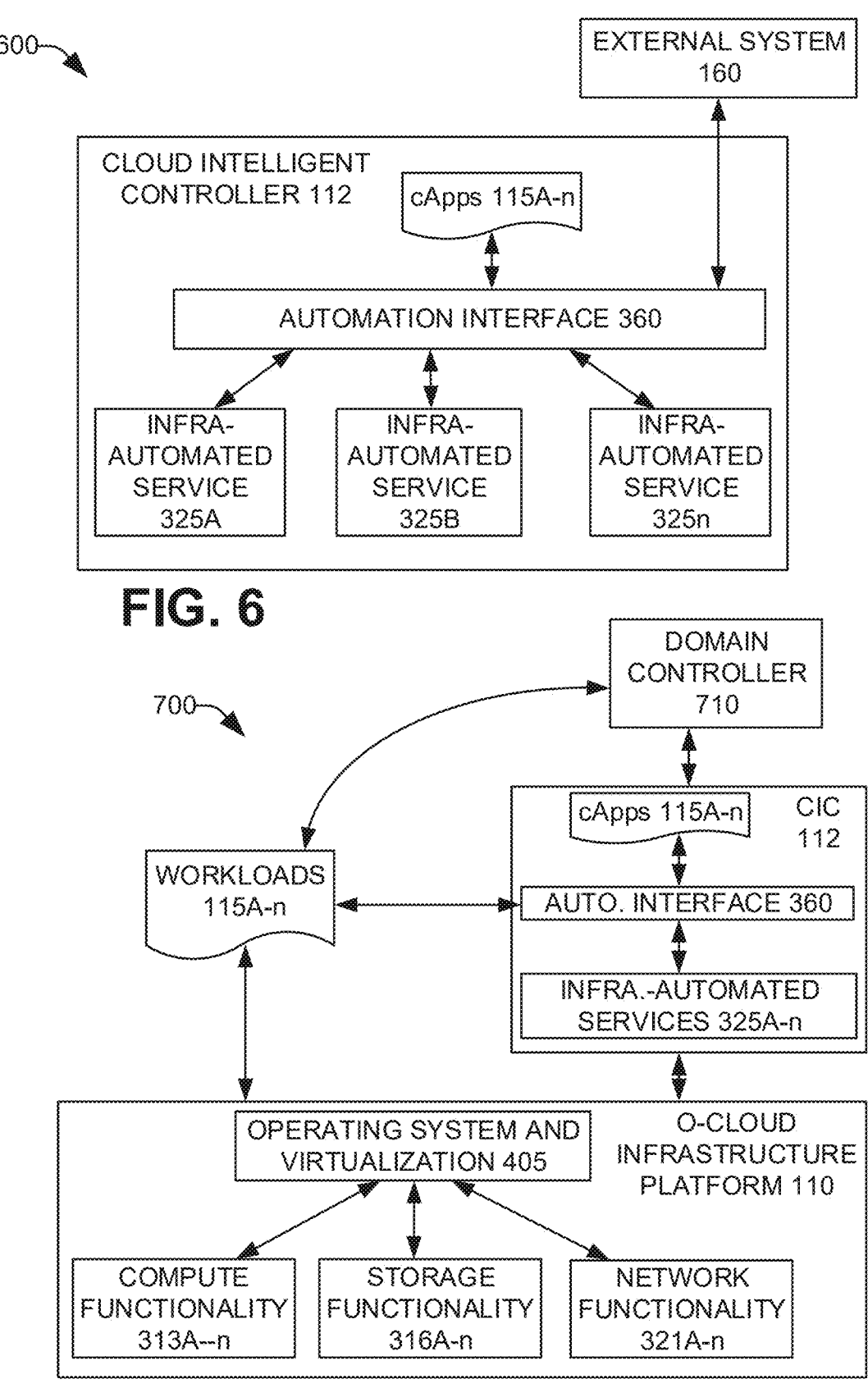
FIG. 6 presents a schematic illustrating a CIC configured to interface with an external system, in accordance with an embodiment.
FIG. 7 presents a schematic illustrating a system for telecommunication operations to be conducted at a CIC/O-Cloud, in accordance with an embodiment.

CIC 112 can also be configured to interface with an external system 160. FIG. 6, schematic 600, illustrates a CIC configured to interface with an external system, in accordance with an embodiment. As shown in FIG. 6, a CIC 112 can be implemented at the O-Cloud platform 110, with respective cApps 115A-n interacting with infrastructure automated services 325A-n via automation interface 360, as previously described (e.g., per FIG. 5). As shown, an external system 160 can configured to interact with/access the automation interface 360. The automation interface 360 can be configured/utilized to expose the infrastructure automation services 325A-n and/or the cApps 115A-n and functionality provided by the respective cApps 115A-n. With reference to FIG. 1, external system 160 can be interfacing with CIC 112 via SMO 120 across the O2 interface 126. It is to be appreciated that while the example system 600 presented herein pertains to a telecommunication configuration, the various embodiments are not so limited, e.g., external system 160/SMO 120 can be replaced with one or more devices utilized for a retail operation, a manufacturing operation, and suchlike, whereby the one or more devices can include an edge cloud configuration. An external system 160 can include cloud-hosted workloads, remote management services, and suchlike.

The automation interface 360 can be of any suitable format, e.g., open source, standardized, vendor proprietary, a combination thereof, and suchlike, as required to enable interaction with/access by the external system 160.

6. Telecommunications Utilizing CIC

FIG. 7, schematic 700, illustrates a system for telecommunication operations to be conducted at a CIC/O-Cloud, in accordance with an embodiment. Telecommunication workloads 305A-n can have near real-time requirements. As shown in FIG. 7, workloads 305A-n can be configured to (a) directly interface/access CIC 112 via an automation interface 360, or (b) indirectly interface/access CIC 112 via a domain controller 710 (e.g., a domain-specific controller, a controller at the SMO 120, a net management system, an element management system (EMS), and suchlike). In an embodiment, CIC 112 can be configured to perform infrastructure management of the O-Cloud platform 110 (e.g., comprising computation resources 312A-n, storage resources 315A-n, network resources 320A-n, and suchlike).

cApps 115A-n can be configured/utilized to deliver workload-specific automation requirements (e.g., per workloads 305A-n). For example, cApps 115A-n can be configured to enable requirements in workloads 305A-n, such as:

(a) monitor performance of network function entities, such as E2 nodes 70A-n, and further generate an alert(s)/alarms 337A-n in the event of a significant issue(s) arising/being determined.

(b) configure/control performance/operation of the O-RAN infrastructure 100, and further implement one or more energy-saving policies for operation of the O-RAN infrastructure 100.

(c) deployment optimization & tuning of workloads 305A-n and/or the O-RAN infrastructure 100.

7. Computer-Implemented Methods

Figure 8:
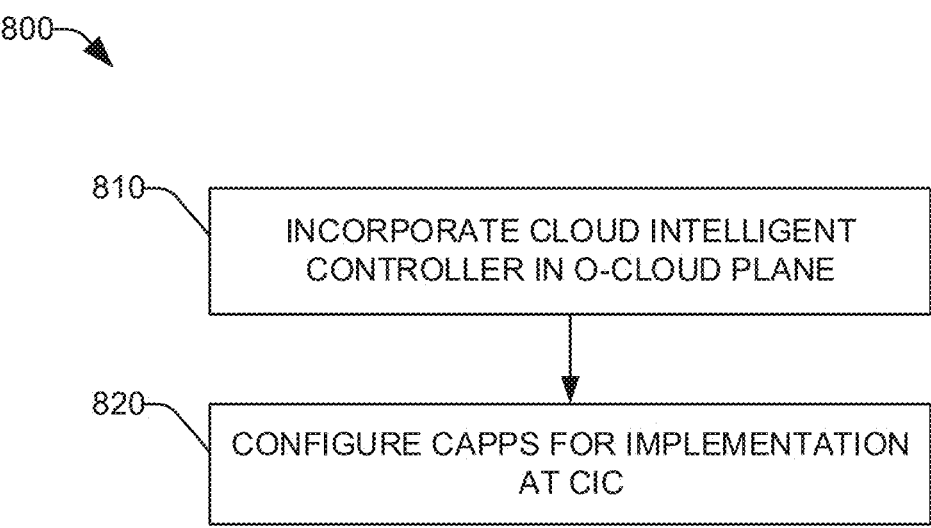
FIG. 8 presents a computer-implemented method for incorporating/implementing a CIC in an O-Cloud plane, in accordance with an embodiment.

FIG. 8, flowchart 800, presents a computer-implemented methodology for incorporating/implementing a CIC in an O-Cloud plane, in accordance with an embodiment.

At 810, a CIC (e.g., CIC 112) can be integrated/incorporated into the O-Cloud infrastructure (110) of a RAN system (e.g., RAN system 105).

At 820, the CIC can be configured to operate in accordance with a plurality of cApps (e.g., cApps 115A-n), wherein, as previously mentioned, the cApps are O-cloud-applications configured to control/implement/access one or more elements of the O-Cloud infrastructure, wherein such elements include resources (e.g., compute resources 312A-n, storage resources 315A-n, network resources 320A-n, and suchlike), functions (e.g., compute functionality 313A-n, storage functionality 316A-n, network functionality 321A-n, and suchlike), services (e.g., infrastructure automation services 325A-n), and suchlike. The cApps can be configured to be system/vendor agnostic such that the cApps can provide abstracted elements for vendors, programmers, etc., to incorporate into their own systems. Accordingly, while an external system may comprise proprietary systems/software applications, the cApps are configured to enable the vendor-implemented applications to interface/interact with the vendor-agnostic O-Cloud infrastructure.

Figure 9:
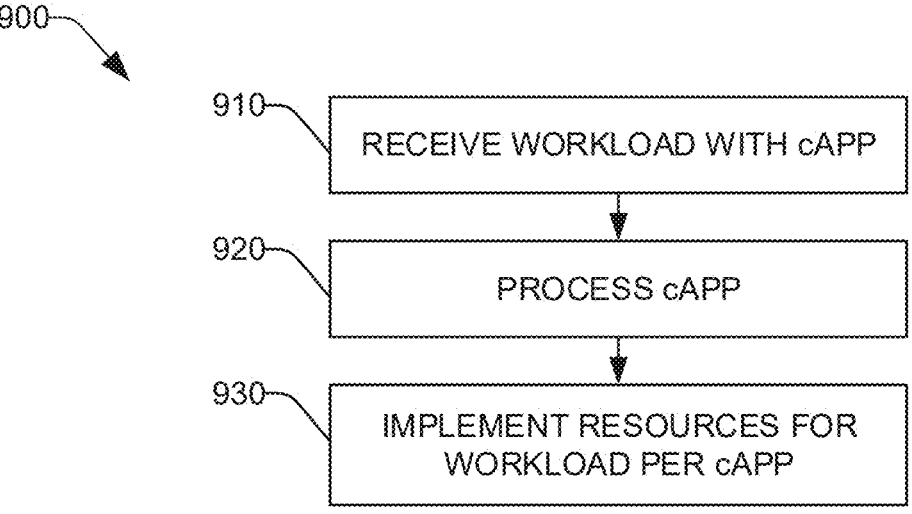
FIG. 9 presents a computer-implemented method for utilizing cApps to implement respective resources available at an O-Cloud, in accordance with an embodiment.

FIG. 9, flowchart 900, presents a computer-implemented method for utilizing cApps to implement respective resources available at an O-Cloud, in accordance with an embodiment.

At 910, a workload (e.g., workload 305A-n) can be received at a CIC (e.g., CIC 112), whereby the workload can be accompanied by a cApp (e.g., cApp 115A-n). The cApp can be configured to represent the respective resources, functionality, etc., to be implemented/accessed/utilized during processing/implementation of the workload. Accordingly, rather than the workload having to be processed to determine the content/processing requirements of the workload, the cApp can provide the information (e.g., data/information 336A-n). As previously mentioned, the CIC can be configured to control operation of respective resources and functionality available at an O-Cloud (e.g., O-Cloud platform 110, O-Cloud infrastructure 310). Hence, by utilizing cApps, the processing/implementation requirements of the workload can be readily determined, e.g., by the CIC, rather than having to be inferred from operations, etc., being performed externally (e.g., on SMO 120, non-RT RIC 122, near-RT RIC 132, and suchlike).

At 920, the CIC can be configured to process the cApp to determine one or more requirements for processing/implementing the workload. For example, the cApp can be configured to indicate which resources/functionality at the O-Cloud (e.g., compute resources 312A-n, storage resources 315A-n, network resources 320A-n, compute functions 313A-n, storage functions 316A-n, network functions 321A-n, infrastructure automation services 325A-n, and suchlike) are required/to be utilized during processing/implementation of the workload at the O-Cloud/O-Cloud infrastructure.

At 930, in accordance with the one or more requirements/content of the cApp and the workload, the workload can be processed/implemented by the CIC at the O-Cloud, with the respective O-Cloud resources/functionality being utilized as required.

Figure 10:
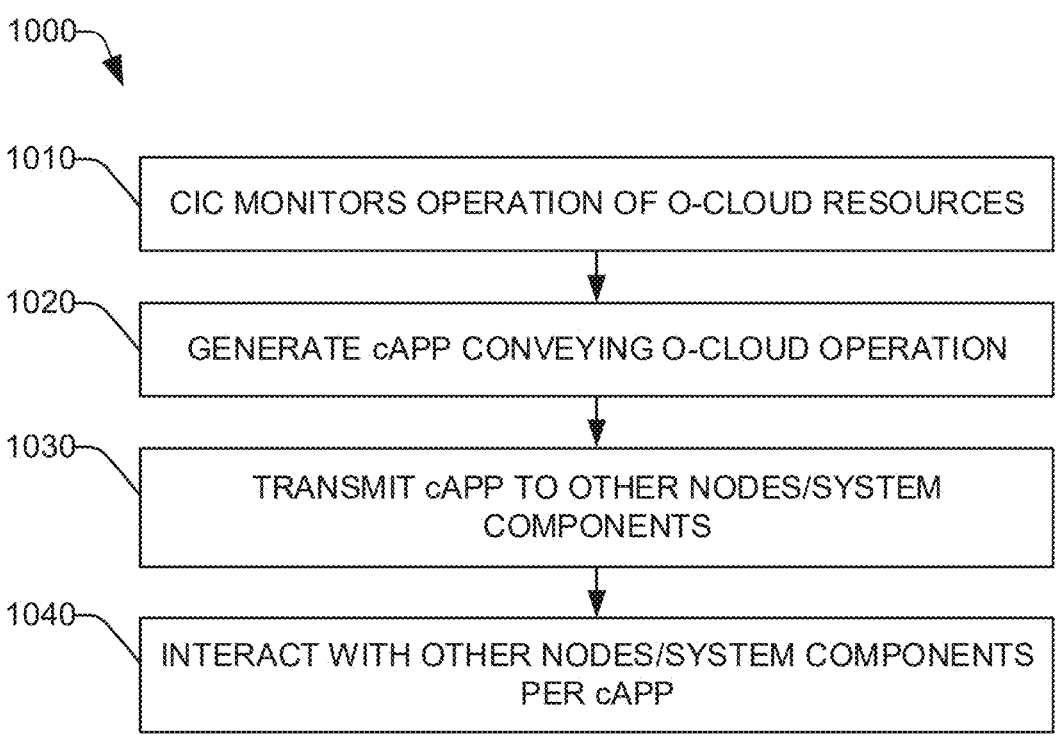
FIG. 10 presents a computer-implemented method for generation and implementation of cApps by a CIC to facilitate interaction with other components/systems included in a RAN, in accordance with an embodiment.

FIG. 10, flowchart 1000, presents a computer-implemented method for generation and implementation of cApps by a CIC to facilitate interaction with other components/systems included in a RAN, in accordance with an embodiment.

At 1010, a CIC (e.g., CIC 112) can be configured to monitor operation of resources (e.g., any of compute resources 312A-n, storage resources 315A-n, network resources 320A-n, compute functions 313A-n, storage functions 316A-n, network functions 321A-n, infrastructure automation services 325A-n, and suchlike) implemented on an O-Cloud (e.g., O-Cloud platform 110/O-Cloud infrastructure 310).

At 1020, the CIC can be configured to generate a cApp (e.g., cApp 115A-n), wherein the cApp is configured to represent operation of the O-Cloud.

At 1030, the CIC can be further configured to transmit the cApp to respective portions of the O-Cloud/RAN which have been configured to implement cApps, whereby the respective portions can include computer resources (e.g., compute resources 312A-n, processor 182), storage resources (e.g., storage resources 316A-n, memory 184), network resources (e.g., network resources 320A-n), nodes (e.g., E2 nodes 170A-n), and suchlike.

At 1040, the CIC can be configured to interact with the other portions of the O-Cloud/RAN per cApps, as well as xApps and rApps. For example, as previously mentioned, AI/ML processes (e.g., process component 350/processes 355A-n) can be configured to be implemented at the CIC and further interact (e.g., process) xApps and/or rApps received at the CIC (e.g., generated/received from other components such as near-RT RIC 132, non-RT RIC 122, and suchlike), wherein the AI/ML processes can be configured to determine the intent of the other components as a function of the respective content of an xApp/rApp.

Figure 11:
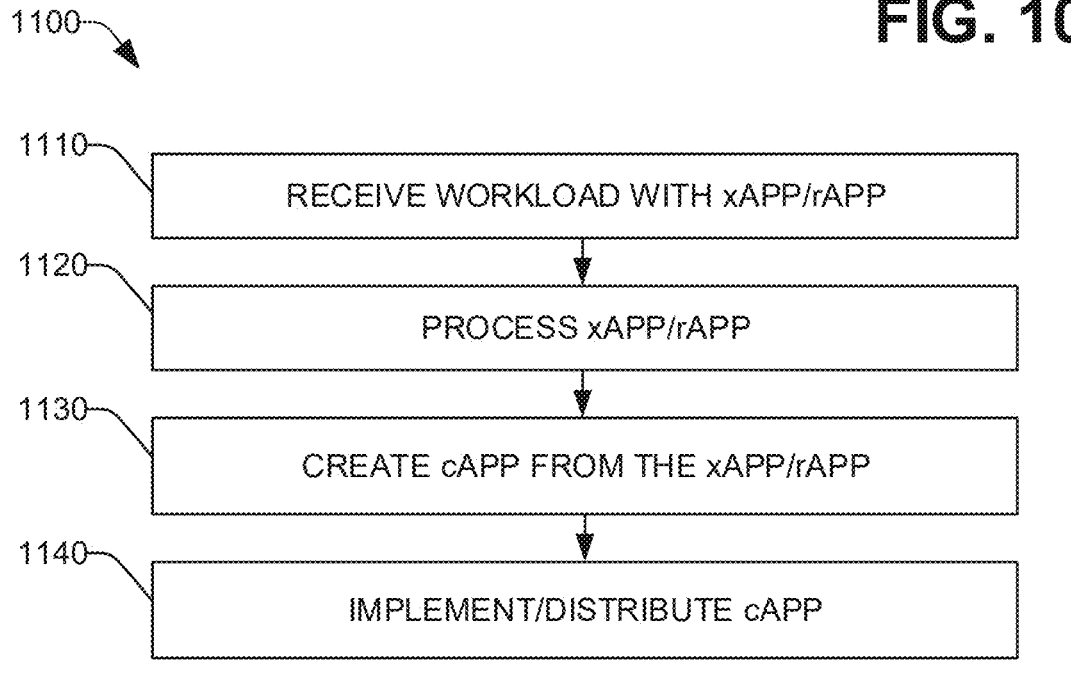
FIG. 11 presents a computer-implemented method for a CIC to interact with applications received from other infrastructure/operational planes of a RAN.

FIG. 11, flowchart 1100, presents a computer-implemented method for a CIC to interact with applications received from other infrastructure/operational planes of a RAN.

At 1110, a CIC (e.g., CIC 112) can be configured to interact with other components implemented across a RAN. For example, an xApp (e.g., an xApp 135A-n) can be received from a near-RT RIC (e.g., a near RT RIC 132), an rApp (e.g., rApp 125A-n) can be received from a non-RT RIC (e.g., non-RT RIC 122).

At 1120, the CIC can be configured to process the respective xApp/rApp.

At 1130, the CIC can be further configured to create a cApp (e.g., cApps 115A-n) in accordance with any information, data (e.g., data 336A-n), instruction, and suchlike, obtained/determined from processing the respective xApp/rApp. Accordingly, while other components in the RAN are configured to generate/utilize xApps/rApps, the CIC has intelligence (e.g., via process component 350/processes 355A-n) to generate cApps to control operation of the O-Cloud infrastructure in accordance with functionality/data provided by components external to the O-Cloud/CIC.

At 1140, the CIC can be configured to implement the cApps to local infrastructure/components and further distribute the cApps across respective portions of the RAN.

8. Example Application/Implementation

FIGS. 12-15, present various example use case scenarios and sequences of operation/interactivity.

8.1. E2 Node Power Control

Figure 12:
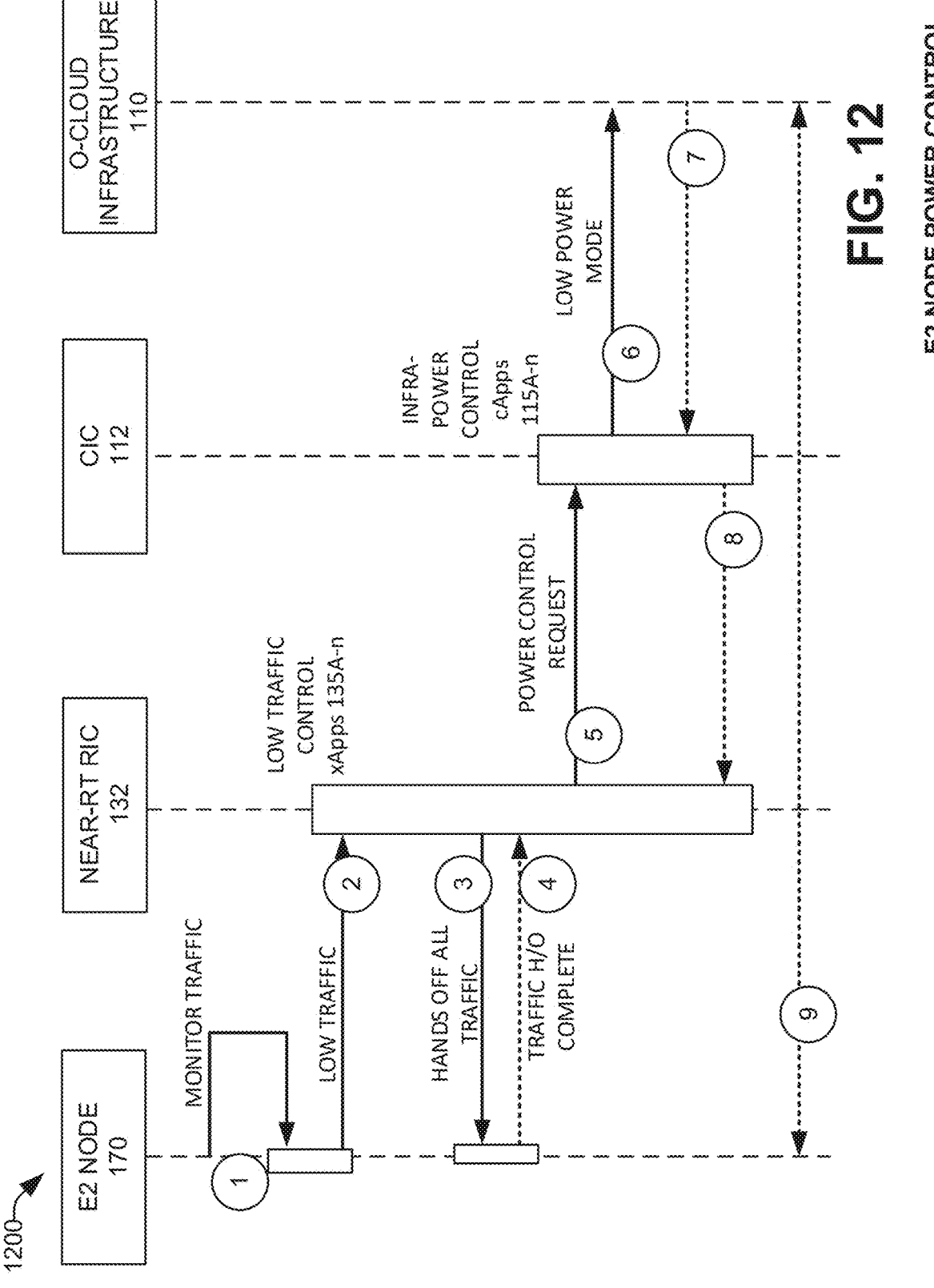
FIG. 12 presents a sequence of operations regarding implementation of a CIC and cApps in an O-Cloud configuration to facilitate power control of an E2 node, in accordance with one or more embodiments.

FIG. 12, schematic 1200, presents a sequence of operations regarding implementation of a CIC and cApps in an O-Cloud configuration to facilitate power control of an E2 node, in accordance with one or more embodiments. Operation of one or more portions of a RAN 105 architecture can be placed in low power mode/power off mode for a duration of time. Accordingly, the CIC 112 and the near-time RIC 132 can be utilized to control operation of power settings for the one or more portions of the RAN 105 infrastructure, e.g., data servers and other devices (not shown).

At 12-1: an E2 node 170 (e.g., a DU 172) can be configured (e.g., by a cApp 115M) to monitor traffic (e.g., communications/data) flowing at the E2 node.

At 12-2: a low volume of traffic (e.g., workloads 305A-n) can be detected between the E2 node 170 and the near-time RIC 132.

At 12-3: the near-time RIC 132 can utilize respective xApps 135A-n to control operation of one or more portions of the O-RAN 105. In an example scenario, an xApp 135A can be generated by the near-time RIC 132 and transmitted to the E2 node 170, whereby xApp 135A includes an instruction for the E2 node 170 to initiate handing off traffic to other E2 nodes (e.g., other DUs 172A-n) to enable a portion of the O-RAN to go into low power mode.

At 12-4, E2 node 170 can send response 337A to the near-RT RIC 132 that traffic handoff has been completed, e.g., traffic is being consolidated/diverted to/handled by other/neighboring nodes 170 (e.g., other DUs 172A-n).

At 12-5, the near-RT RIC 132, in response to receiving the notification that traffic handoff has been completed, can generate an xApp 135B requesting that the CIC 112 powers down (e.g., while traffic volume is below a particular threshold volume) the O-Cloud infrastructure 110 (and any other associated infrastructure of O-RAN 105 controlled by CIC 112).

At 12-6, CIC 112 can generate a cApp 115A configured to control operational power of the O-Cloud infrastructure 110. The cApp 115 configured to control infrastructure power can be forwarded to respective components/architecture to facilitate low power mode operation (e.g., of compute resources 312A-n, storage resources 315A-n, network resources 320A-n, with according reduced/halted operation of compute functionality 313A-n, storage functionality 316A-n, network functionality 321A-n, and infrastructure automation services 325A-n).

At 12-7, the CIC 112 can be further configured to monitor operation of the O-Cloud infrastructure 110, e.g., confirms that the O-Cloud infrastructure 110 is in low power mode.

At 12-8, the CIC 112 can be further configured to generate/transmit a cApp 115B to the near-RT RIC 132 indicating the O-Cloud infrastructure 110 is in low power mode. In an embodiment, the near-RT RIC 132 can be configured to process the cApp 115B. In an alternative embodiment, CIC 112 can be configured to generate and transmit an xApp 135A-n to the near-RT RIC 132, indicating the O-Cloud infrastructure 110 is in low power mode.

At 12-9, traffic on RAN 105 can be continued to be monitored (e.g., by E2 node 170, near-RT RIC 132, and suchlike) and in response to a determination that the respective portions of the RAN 105 should return to normal usage, the respective actions at steps 1-8 can be reversed/updated to facilitate resumption of traffic handling/processing at that portion of RAN 105.

With regard to the operations presented in FIG. 12, considerations include:

a) correlating identifiers: correlation of E2 node 170 identity with infrastructure compute identity where an E2 node 170 function executes. In a conventional system (e.g., conventional RAN 205), such concept/information is typically only known by a domain controller, e.g. SMO 120. However, per the various embodiments presented herein, such concepts/information can be extended to/implemented (e.g., by cApps 115A-n) at O-Cloud platform 110, CIC 112, E2 nodes 170, and suchlike, enabling tighter coupling/operation of components/devices across the RAN 105.

b) E2 node 170 composition: E2 nodes 170 (e.g., CU-CP, CU-UP, CU, and suchlike) can be composed of one or more virtualized/containerized functions. Utilizing CIC 112 and cApps 115A-n enables fine-grained control of multiple aspects/functionality regarding operation of E2 nodes 170, where such aspects/functionality can include, for example, deployment, pinning, memory optimization, transport network configuration, power control, etc.

8.2. SMO Driven Power Control

Figure 13:
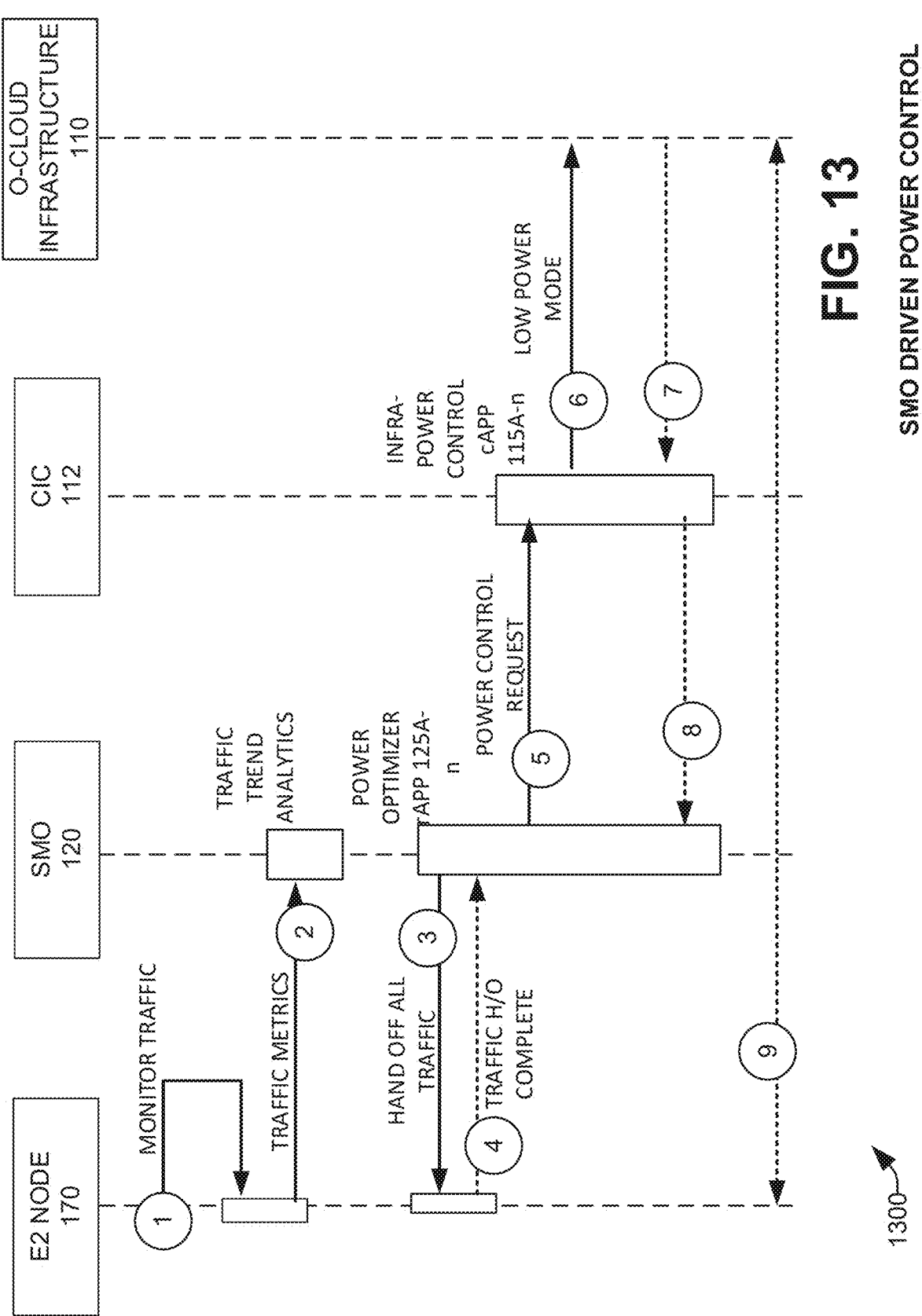
FIG. 13 presents a sequence of operations regarding implementation of a CIC and cApps in an O-Cloud configuration to facilitate power control of an E2 node, in accordance with one or more embodiments.

FIG. 13, schematic 1300, presents a sequence of operations regarding implementation of a CIC and cApps in an O-Cloud configuration to facilitate power control of an E2 node, in accordance with one or more embodiments. Respective operations/aspects presented in FIG. 13 are comparable to the operations/aspects presented in FIG. 12, however, while FIG. 12 related to power control with near-RT RIC 132, power control of respective portions/infrastructure of the O-Cloud platform 110 can also be performed by CIC 112 in conjunction with the SMO 120, e.g., with a SMO 120 hosted optimization rApp 125A-n. Accordingly, while the near-RT RIC 132/xApps 135A-n can be utilized to facilitate power control in near-RT, the SMO 120/rApps 125A-n can be utilized to facilitate power control in non-RT.

At 13-1: an E2 node 170 (e.g., a DU 172) can be configured to monitor traffic (e.g., workloads 305A0-*n*, communications/data 336A-n) flowing/processed at the E2 node.

At 13-2: traffic data/metrics (e.g., in historical data 390A-n) can be compiled at the E2 node 170 and forwarded to the SMO 120.

At 13-3: the SMO 120 can perform analysis (e.g., trend analysis) of the traffic data/metrics in historical data 390A-n and further utilize respective rApps 125A-n to control operation of one or more portions of the O-RAN 105. In an example scenario, in response to a determination by the SMO 120 that workload traffic is showing a trend of low usage, an rApp 125A can be generated by the SMO 120 and transmitted to the E2 node 170, whereby rApp 125A includes an instruction for the E2 node 170 to initiate handing off traffic to other E2 nodes (e.g., other DUs 172A-n) to enable a portion of the O-RAN to go into low power mode. In an aspect, the SMO 120 can be configured to utilize/perform historical trend analysis of traffic to determine an optimum time duration/period for low power modes based on historical traffic trends.

At 13-4, E2 node 170 can send response 337A to the SMO 120 that traffic handoff has been completed, e.g., traffic is being consolidated/diverted to/handled by other/neighboring nodes 170 (e.g., other DUs 172A-n).

At 13-5, SMO 120, in response to receiving the notification 337A that traffic handoff has been completed, can generate an rApp 125B requesting that the CIC 112 powers down (e.g., while traffic volume is below a particular threshold volume) the O-Cloud infrastructure 110 of concern (and any other associated infrastructure of O-RAN 105 controlled by CIC 112).

At 13-6, CIC 112 can generate a cApp 115A configured to control operational power of the O-Cloud infrastructure 110. The cApp 115 configured to control infrastructure power can be forwarded to respective components/architecture to facilitate low power mode operation (e.g., of compute resources 312A-n, storage resources 315A-n, network resources 320A-n, with according reduced/halted operation of compute functionality 313A-n, storage functionality 316A-n, network functionality 321A-n, and infrastructure automation services 325A-n).

At 13-7, the CIC 112 can be further configured to monitor operation of the O-Cloud infrastructure 110, e.g., confirms that the O-Cloud infrastructure 110 is in low power mode.

At 13-8, the CIC 112 can be further configured to generate/transmit a cApp 115B to SMO 120 indicating the O-Cloud infrastructure 110 is in low power mode. In an embodiment, SMO 120 can be configured to process the cApp 115B. In an alternative embodiment, CIC 112 can be configured to generate and transmit an rApp 125A-n to the SMO 120, indicating the O-Cloud infrastructure 110 is in low power mode.

At 13-9, traffic on RAN 105 can be continued to be monitored (e.g., by E2 node 170, SMO 120, and suchlike) and in response to a determination (e.g., subsequent trend analysis) that the respective portions of the RAN 105 should return to normal usage, the respective actions at steps 1-8 can be reversed/updated to facilitate resumption of traffic handling/processing at that portion of RAN 105.

8.3. Rolling Infrastructure Firmware Updates

Figure 14:
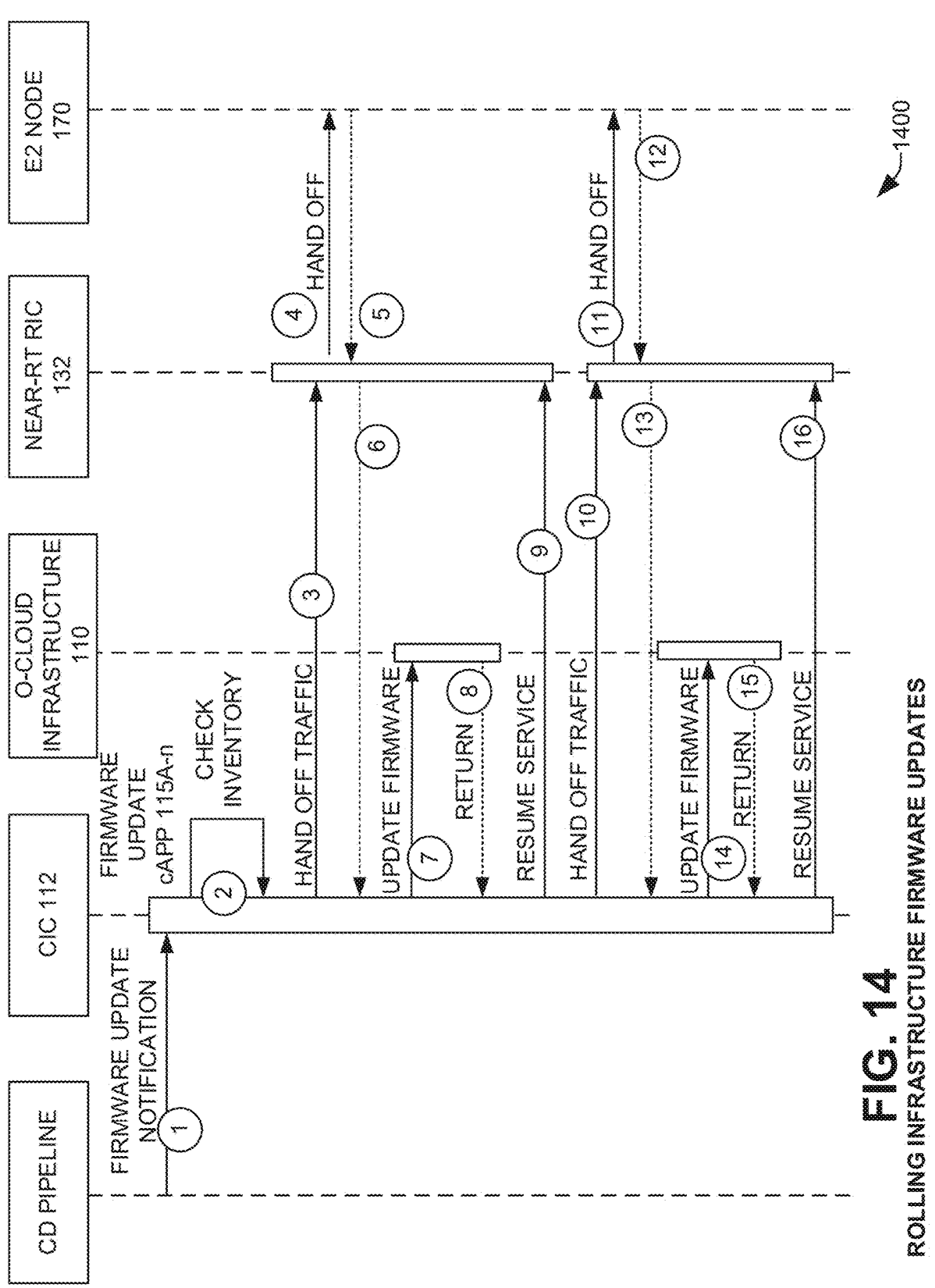
FIG. 14 presents a sequence of operations regarding implementation of a firmware update utilizing CIC and cApps in an O-Cloud configuration, in accordance with one or more embodiments.

FIG. 14, schematic 1400, presents a sequence of operations regarding implementation of a firmware update utilizing CIC and cApps in an O-Cloud configuration, in accordance with one or more embodiments. Firmware updates can be performed at one or more portions of a RAN 105, e.g., as part of continuous integration and continuous delivery/continuous deployment (CI/CD) operations.

At 14-1: an update can be provided from a CD pipeline, e.g., via SMO 120. In an embodiment, the update can be a vendor-specific infrastructure update made available to the administrator/operator 338 of RAN 105, e.g., via the CI/CD pipeline SMO 120.

At 14-2: at CIC 112, a cApp 115A can be configured to implement the firmware update. CIC 112/cApp 115A can be utilized to determine inventory (e.g., E2 nodes 170, devices, components, and suchlike,) across RAN 105 and versioning (e.g., to determine focus of the firmware update, and current status of the firmware).

At 14-3: CIC 112/cApp 115A can be configured to instruct near-RT RIC 132 to initiate traffic handoff at E2 node 170 (e.g., as previously described in FIG. 13). cApp 115A can utilize near-RT RIC 132 to ensure minimal traffic disturbance at E2 node 170.

At 14-4: the near-RT RIC 132 can be configured to control traffic handoff at E2 node 170 (e.g., via an xApp 135A).

At 14-5: E2 node 170 can inform near-RT RIC 132 that traffic has been handed off.

At 16-6: near-RT RIC 132 can inform CIC 112 of traffic being handed off at the E2 node 170.

At 14-7: during the period of traffic hand off, updating of firmware at the O-Cloud infrastructure 110 can proceed.

At 14-8: the firmware operation can be monitored by the CIC 112, with a determination that updating of the firmware at the O-Cloud infrastructure 110 has been completed.

At 14-9: CIC 112 can further instruct the near-RT RIC 132 to resume servicing traffic at E2 node 170.

At 14-10: Rolling firmware updates can be implemented across the O-Cloud infrastructure 110 landscape. In the event of a subsequent firmware update is to be performed, CIC 112 can further instruct the near-RT RIC 132 to handoff traffic at the E2 node 170 once again. In an alternative example scenario, in the event of a firmware update is to be performed across a set of E2 nodes 170A-n, CIC 112 can further instruct the near-RT RIC 132 to handoff traffic at the respective E2 node 170A-n as required for the firmware update to be implemented across E2 nodes 170A-n.

At 14-11: the near-RT RIC 132 once again controls traffic handoff at E2 node 170 (e.g., via an xApp 135A).

At 14-12: E2 node 170 can inform near-RT RIC 132 that traffic has been handed off.

At 14-13: near-RT RIC 132 can inform CIC 112 of traffic being handed off at the E2 node 170.

At 14-14: during the period of traffic hand off, subsequent updating of firmware at the O-Cloud infrastructure 110 can proceed.

At 14-15: the firmware operation can be monitored by the CIC 112, with a determination that updating of the firmware at the O-Cloud infrastructure 110 has been completed.

At 14-16: CIC 112 can further instruct the near-RT RIC 132 to resume servicing traffic at E2 node 170.

8.4. Incident Response

Figure 15:
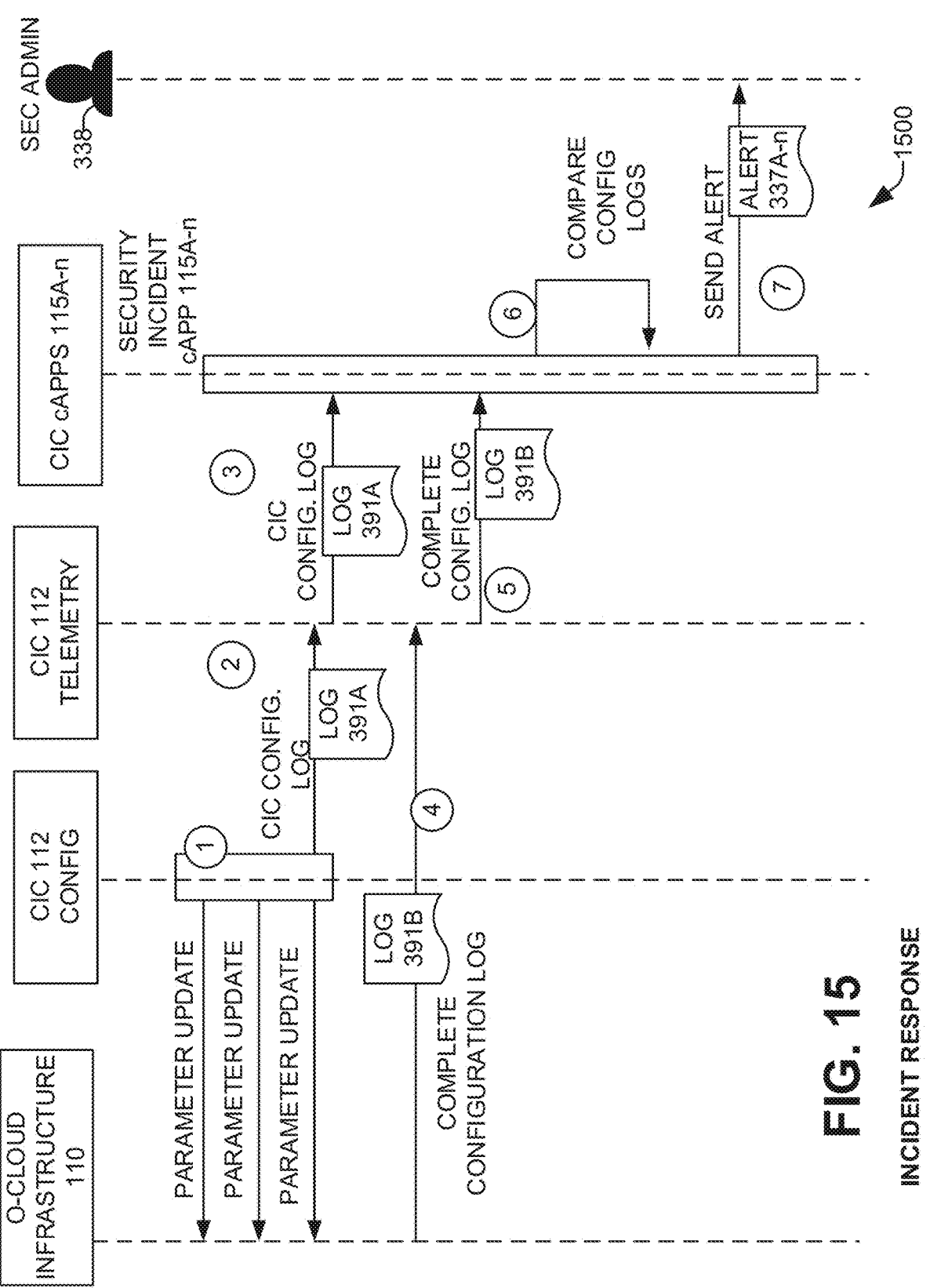
FIG. 15 presents a sequence of operations regarding determining and reporting of deviations of one or more configurations in an O-Cloud infrastructure, in accordance with one or more embodiments.

FIG. 15, schematic 1500, presents a sequence of operations regarding determining and reporting of deviations of one or more configurations in O-Cloud infrastructure, in accordance with one or more embodiments. Logs of respective configuration updates performed on one or more O-Cloud platform 110 infrastructure management processes can be compared, per respective device configuration logs. Any detected deviations or discrepancies can generate/transmit a notification alert(s) to the relevant administrator(s).

At 15-1: CIC 112 can be configured to update respective parameters, settings, and suchlike, of one or more components/devices in the O-Cloud infrastructure 110.

At 15-2: a configuration log 391A (aka CIC configuration log, first configuration log), of the respective updates performed by the CIC 112 (e.g., telemetry operation regarding data 336A-n by data historian 365) can be forwarded, e.g., as a configuration update is performed, at a specified time, etc. For example, configuration log 391A pertains to a set of configurations implemented by CIC 112 at a node 170A.

At 15-3: respective CIC configuration logs/updates can be compiled at CIC 112 and presented for review by a security incident cApp 115S configured to review/compare different/respective configuration logs 391A-n.

At 15-4: a complete configuration log 391B (aka, a second configuration log) can also be compiled by CIC 112, wherein the complete configuration log 391B indicates all configuration updates applied to the respective component/device in the O-Cloud infrastructure 110 (e.g., E2 node 170A), potentially not just those implemented by the CIC 112, e.g., other configuration updates implemented by a malfunctioning component/device in the RAN 105, by a malicious entity (not shown), and suchlike.

At 15-5: the complete configuration log 391B can be compiled (e.g., by data historian 365) and presented for review by a security incident cApp 115S.

At 15-6: cApp 115S can be generated and configured to compare the CIC configuration log 391A and the complete configuration log 391B. cApp 115S can be implemented by CIC 112, data historian 365, etc.

At 15-7: in the event of a determination by cApp 115S of one or more discrepancies/deviations existing between the CIC configuration log 391A and the complete configuration log 192B, cApp 115S/CIC 112 can be configured to generate and transmit a notification/alert/alarm 337A-n to an administrator 338 of the respective portion of the O-Cloud platform 110/RAN 105 infrastructure of concern. Examples of deviations/discrepancies include configuration parameter values do not match, misaligned config timestamps, unusual behavior such as frequent changes to a parameter configuration(s), missing user ID, and suchlike.

9. AI/ML Considerations

As mentioned, various processes 355A-n can be configured to determine information, make predictions, etc., regarding implementation and operation of CIC 112, cApps 115A-n, and the O-Cloud infrastructure 110/310. As previously mentioned, the processes 355A-n can include AI, ML, and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., power control, firmware updating, incident response, and suchlike at the O-Cloud infrastructure 110/310, implementation of cApps 115A-n, interaction with near-RT RIC 132/xApps 135A-n and/or SMO 120/rApps 125A-n, which as mentioned, can be facilitated via an automatic classifier system and process.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the various embodiments presented herein, the CIC 112 can obtain operational data (e.g., data 336A-n, compute functions 313A-n, storage functions 316A-n, network functions 321A-n, and suchlike) from the cApps 115A-n (and rApps 125A-n, xAPPs 135A-n) regarding the parameters, metrics, use cases, etc., that the respective cApp 115A-n is configured to control/adjust. The processes 355A-n can include AI, ML, and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., generating/utilizing cApps 115A-n, controlling O-Cloud layer 110, O-Cloud infrastructure 310, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis (e.g., factoring into the analysis utilities and costs) to prognose or infer an action that a user desires to be automatically performed (e.g., generating/utilizing cApps 115A-n, controlling O-Cloud layer 110, O-Cloud infrastructure 310, and suchlike).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing behavior of cApps 115A-n, controlling O-Cloud layer 110, O-Cloud infrastructure 310, RAN 105 behavior, receiving extrinsic information, and suchlike). For example, SVM's are configured via a learning or training phase within a classifier constructor and feature selection module. Thus, the classifier (s) can be used to automatically learn and perform a number of functions, including but not limited to determining according to predetermined criteria, e.g., cApps 115A-n, controlling O-Cloud layer 110, O-Cloud infrastructure 310, and suchlike.

As described supra, inferences can be made, and operations performed, based on numerous pieces of information. For example, information/data (e.g., data 336A-n) regarding generating/utilizing cApps 115A-n, controlling O-Cloud layer 110, O-Cloud infrastructure 310, historical usage (e.g., in historical data 390A-n), predicted usage, etc., as operation of the cApps 115A-n continues, enabling analysis to determine converging patterns such that inferences can be made regarding generating/utilizing cApps 115A-n, controlling O-Cloud layer 110, O-Cloud infrastructure 310, etc.

10. Further Computer-Implemented Methods

FIG. 16 illustrates a block flow diagram for a process 1600 associated with implementing a CIC and cApps at an O-Cloud platform, in accordance with one or more embodiments presented herein. At 1610, the process 1600 can comprise a cloud intelligent controller (CIC) system (e.g., CIC 112), comprising at least one processor (e.g., processor 182), and a memory (e.g., memory 184) coupled to the at least one processor and having instructions stored thereon, wherein, in response to the at least one processor executing the instructions, the instructions facilitate performance of operations, comprising identifying a first O-Cloud application (cApp) (e.g., cApps 115A-n), wherein the first cApp is configured for implementation at an O-Cloud infrastructure (e.g., O-Cloud platform 110) in a radio access network (RAN) (e.g., RAN 105). At 1620, the process 1600 can further comprise identifying a resource (e.g., any of compute resource 312A-n, storage resource 315A-n, network resource 320A-n) available via the O-Cloud infrastructure (e.g., O-Cloud platform 110) pertaining to content in the first cApp (e.g., cApp 115A). At 1630, the process 1600 can further comprise implementing the first cApp (cApp 115A) at the resource (e.g., any of compute resource 312A-n, storage resource 315A-n, network resource 320A-n) in the O-Cloud infrastructure (e.g., O-Cloud platform 110).

FIG. 17 illustrates a block flow diagram for a process 1700 associated with implementing a CIC and cApps at an O-Cloud platform, in accordance with one or more embodiments presented herein. At 1710, the process 1700 can comprise utilizing, by a cloud intelligent controller (CIC) (e.g., CIC 112) comprising at least one processor (e.g., processor 182), one or more O-cloud-applications (cApps) (e.g., cApps 115A-n) to control operation of resources (e.g., any of compute resource 312A-n, storage resource 315A-n, network resource 320A-n) available via an O-Cloud platform (e.g., O-Cloud platform 110). At 1720, the process 1700 can further comprise processing, by the CIC (e.g., CIC 112), the cApps (e.g., cApps 115A-n), the CIC (e.g., CIC 112) being communicatively coupled to the resources (e.g., any of compute resource 312A-n, storage resource 315A-n, network resource 320A-n) available via the O-Cloud platform (e.g., O-Cloud platform 110) and configured to control operation of the resources (e.g., any of compute resource 312A-n, storage resource 315A-n, network resource 320A-n).

Figure 18:
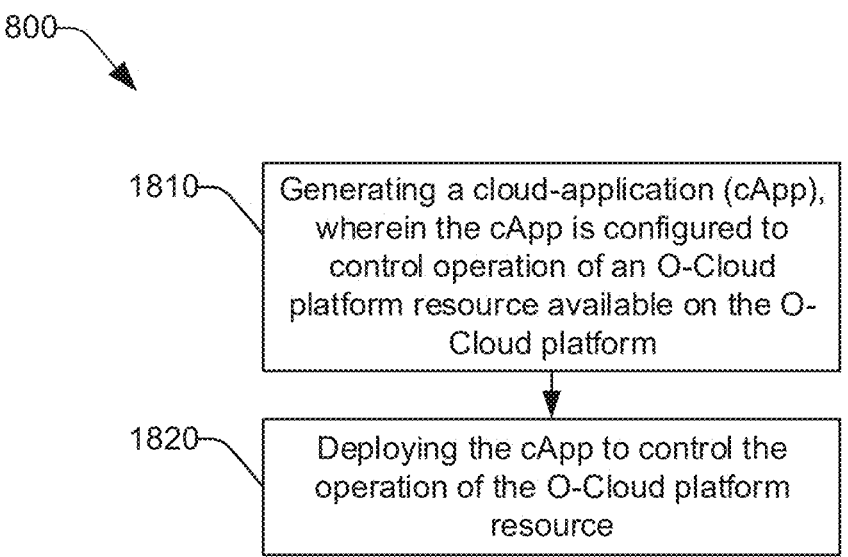
FIG. 18 illustrates a block flow diagram for a process associated with implementing a CIC and cApps at an O-Cloud platform, in accordance with one or more embodiments presented herein.

FIG. 18 illustrates a block flow diagram for a process 1800 associated with implementing a CIC and cApps at an O-Cloud platform, in accordance with one or more embodiments presented herein. At 1810, the process 1800 can be performed by a computer program product stored on a non-transitory computer-readable medium and comprising machine-executable instructions, wherein, in response to being executed, the machine-executable instructions cause a cloud intelligent controller (CIC) (e.g., CIC 112) that is part of an O-Cloud platform (e.g., O-Cloud platform 110) to perform operations, wherein the process 1800 can comprise generating an O-cloud-application (cApp) (e.g., cApps 115A-n), wherein the cApp (e.g., cApps 115A-n) is configured to control operation of an O-Cloud platform resource (e.g., any of compute resource 312A-n, storage resource 315A-n, network resource 320A-n) available on the O-Cloud platform (e.g., O-Cloud platform 110). At 1820, the process 1800 can further comprise deploying the cApp (e.g., cApps 115A-n) to control the operation of the O-Cloud platform resource (e.g., any of compute resource 312A-n, storage resource 315A-n, network resource 320A-n).

11. Example Environments of Use

Figure 19:
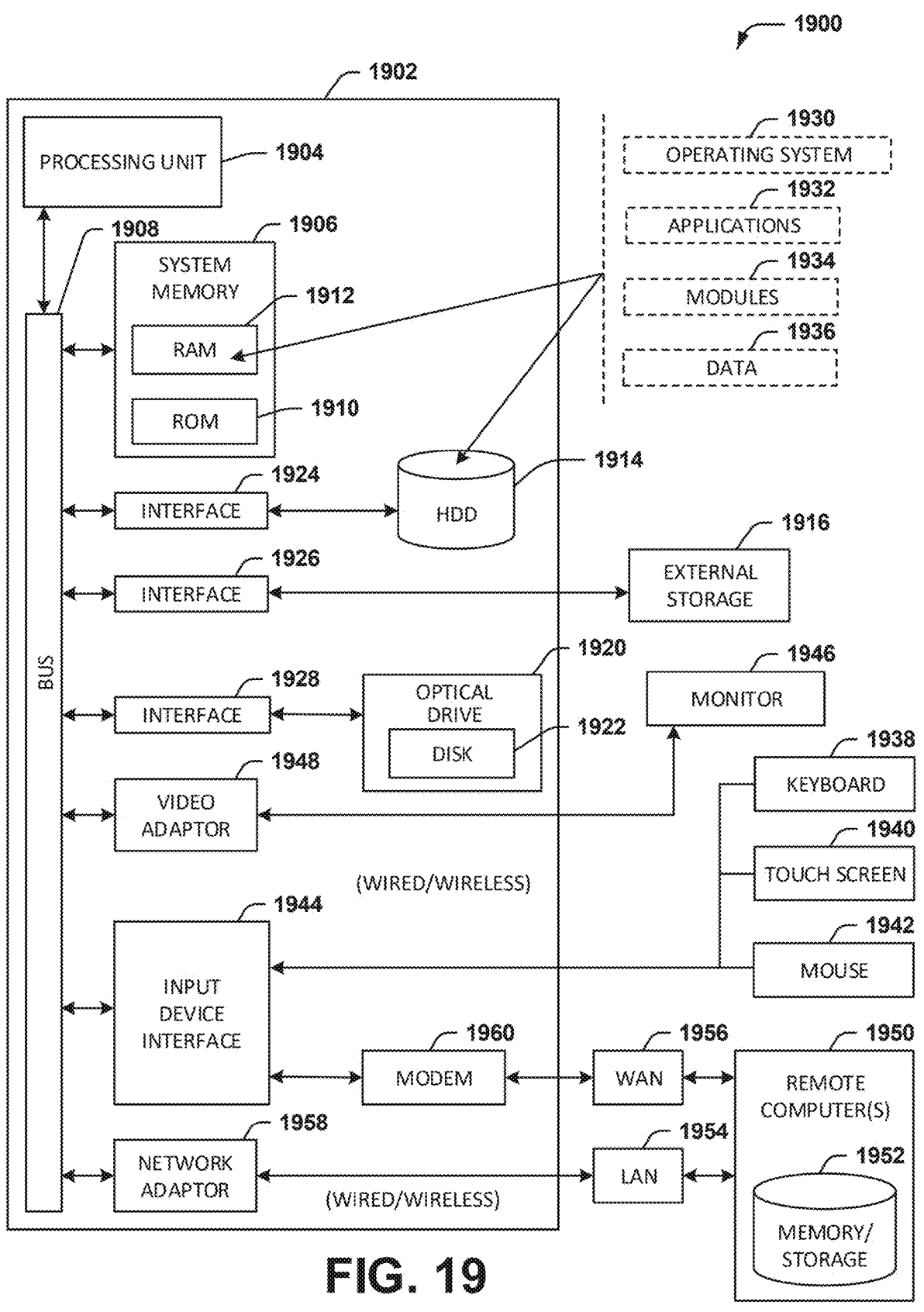
FIG. 19 illustrates an example wireless communication system, in accordance with one or more embodiments described herein.
Figure 20:
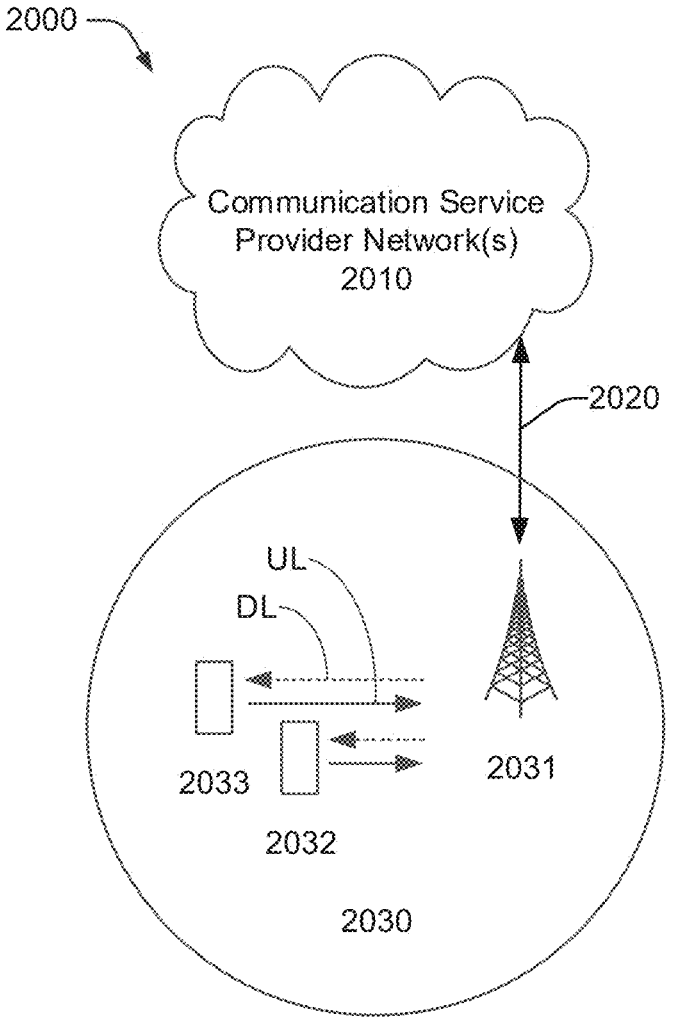
FIG. 20 presents an example environment for implementing various embodiments presented herein.

Turning next to FIGS. 19-20, a detailed description is provided of additional context for the one or more embodiments described herein with FIGS. 1-18.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors and may include a cache memory. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid-state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1084 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can comprise a security module, such as a trusted processing module (TPM). For instance, with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1094 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 20, an illustrative cloud computing environment 2000 is depicted. FIG. 20 is a schematic block diagram of a computing environment 2000 with which the disclosed subject matter can interact. The system 2000 comprises one or more remote component(s) 2010. The remote component(s) 2010 can be hardware and/or software (e.g., threads, processes, computing devices). In some embodiments, remote component(s) 2010 can be a distributed computer system, connected to a local automatic scaling component and/or programs that use the resources of a distributed computer system, via communication framework 2040. Communication framework 2040 can comprise wired network devices, wireless network devices, mobile devices, wearable devices, radio access network devices, gateway devices, femtocell devices, servers, etc.

The system 2000 also comprises one or more local component(s) 2020. The local component(s) 2020 can be hardware and/or software (e.g., threads, processes, computing devices). In some embodiments, local component(s) 2020 can comprise an automatic scaling component and/or programs that communicate/use the remote resources 2010 and 2020, etc., connected to a remotely located distributed computing system via communication framework 2040.

One possible communication between a remote component(s) 2010 and a local component(s) 2020 can be in the form of a data packet adapted to be transmitted between two or more computer processes. Another possible communication between a remote component(s) 2010 and a local component(s) 2020 can be in the form of circuit-switched data adapted to be transmitted between two or more computer processes in radio time slots. The system 2000 comprises a communication framework 2040 that can be employed to facilitate communications between the remote component(s) 2010 and the local component(s) 2020, and can comprise an air interface, e.g., Uu interface of a UMTS network, via a long-term evolution (LTE) network, etc. Remote component(s) 2010 can be operably connected to one or more remote data store(s) 2050, such as a hard drive, solid state drive, SIM card, device memory, etc., that can be employed to store information on the remote component(s) 2010 side of communication framework 2040. Similarly, local component(s) 2020 can be operably connected to one or more local data store(s) 2030, that can be employed to store information on the local component(s) 2020 side of communication framework 2040.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A cloud intelligent controller (CIC) system, comprising:

at least one processor; and at least one memory coupled to the at least one processor and having instructions stored thereon, wherein, in response to the at least one processor executing the instructions, the instructions facilitate performance of operations, comprising:

identifying a first O-Cloud application (cApp), wherein the first cApp is configured for implementation at an O-Cloud infrastructure in a radio access network (RAN), wherein the CIC system is located in an O-Cloud platform comprising the O-Cloud infrastructure located in the RAN, and wherein the CIC system is configured to control operation of the O-Cloud infrastructure;

identifying a resource available via the O-Cloud infrastructure pertaining to content in the first cApp; and implementing the first cApp at the resource in the O-Cloud infrastructure.

2. The CIC system of claim 1, wherein the RAN is configured according to an Open-RAN configuration.

3. The CIC system of claim 1, wherein the resource is one of a compute resource, a storage resource, a cloud resource, or a network resource.

4. The CIC system of claim 1, wherein the first cApp is associated with a workload, and wherein the workload is configured to be implemented using the resource in the O-Cloud infrastructure.

5. The CIC system of claim 1, wherein the operations further comprise:

receiving an instruction, wherein the instruction is to set the O-Cloud infrastructure into a low power mode; and in response to processing the instruction, setting the O-Cloud infrastructure into a defined low power mode operation according to the low power mode.

6. The CIC system of claim 5, wherein the instruction is received by an xApp, and wherein the xApp was received from a near-real time RAN intelligent controller communicatively coupled to the O-Cloud infrastructure.

7. The CIC system of claim 6, wherein the operations further comprise:

generating a second cApp, wherein the second cApp indicates a first node, in the O-Cloud infrastructure, that is being placed in low power mode; and sending the second cApp to a second node in the O-Cloud infrastructure, content of the second cApp indicating to the second node that the first node is being placed in low power mode.

8. The CIC system of claim 7, wherein the operations further comprise:

generating the second cApp with an instruction to the second node that instructs the second node to handle any traffic handed off by the first node while the first node is in low power mode.

9. The CIC system of claim 1, wherein the operations further comprise:

comparing a first configuration log comprising a first group of configurations instructed to be implemented via the O-Cloud infrastructure with a second configuration log comprising a second group of configurations implemented via the O-Cloud infrastructure;

in response to determining first content of the first configuration log and second content of the second configuration log do not match, generating an alert indicating that the first content of the first configuration log and the second content of the second configuration log are disparate; and transmitting the alert to a device associated with an entity monitoring operation of the O-Cloud infrastructure.

10. A computer-implemented method comprising:

utilizing, by a cloud intelligent controller (CIC) comprising at least one processor, one or more O-cloud applications (cApps) to control operation of resources available via an O-Cloud platform, wherein the CIC is located in the O-Cloud platform comprising an O-Cloud infrastructure, and wherein the CIC is configured to control operation of the O-Cloud infrastructure; and processing, by the CIC, the cApps, the CIC being communicatively coupled to the resources available via the O-Cloud platform and configured to control operation of the resources.

11. The computer-implemented method of claim 10, further comprising:

receiving, by the CIC, a workload from the O-Cloud platform and a cApp, of the one or more cApps, corresponding to the workload, wherein the cApp defines one or more processing specifications applicable to the workload;

determining, by the CIC, based on content of the cApp, an O-Cloud resource usable to implement the workload, wherein the O-Cloud resource is included in O-Cloud resources communicatively coupled to the CIC; and implementing, by the CIC, the workload using the O-Cloud platform resource.

12. The computer-implemented method of claim 10, further comprising:

determining, by the CIC, a first operation of a first O-Cloud resource;

generating, by the CIC, a cApp, of the one or more cApps, configured to define the first operation of the first O-Cloud resource; and implementing, by the CIC, the cApp using a second O-Cloud resource, wherein a second operation of the second O-Cloud resource depends on the first operation of the first O-Cloud resource.

13. The computer-implemented method of claim 12, wherein the first operation of the first O-Cloud resource is to implement a low power mode and the second operation of the second O-Cloud resource is to process a transferred workload handed off to the second O-Cloud resource while the first O-Cloud resource is in low power mode.

14. The computer-implemented method of claim 10, further comprising:

implementing, by the CIC, a first set of operational configurations using a first O-Cloud resource;

generating, by the CIC, a first configuration log defining the first set of operational configurations to be implemented using the first O-Cloud resource;

generating, by the CIC, a second configuration log defining a current operating condition of the first O-Cloud resource; and in response to a determination that first content of the first configuration log does not match second content of the second configuration log, generating, by the CIC, an alarm indicating a disparity between the first content of the first configuration log and the second content of the second configuration log.

15. The computer-implemented method of claim 10, wherein the CIC is communicatively coupled to a non-real time radio access network intelligent controller (RIC) incorporated into a service management and orchestration platform and a near-real time RIC configured to control operations at an O-RAN-compliant central unit (O-CU) or an O-RAN-compliant distributed unit (O-DU).

16. A computer program product stored on a non-transitory computer-readable medium and comprising machine-executable instructions, wherein, in response to being executed, the machine-executable instructions cause a cloud intelligent controller (CIC) that is located in an O-Cloud platform to perform operations, comprising:

onboarding an O-cloud application (cApp), wherein the cApp is configured to control operation of an O-Cloud platform resource available on the O-Cloud platform, wherein the O-Cloud platform comprises an O-Cloud infrastructure, and wherein the CIC is configured to control operation of the O-Cloud infrastructure; and deploying the cApp to control the operation of the O-Cloud platform resource.

17. The computer program product according to claim 16, wherein the O-Cloud platform resource can be implemented at a node communicatively coupled to the O-Cloud platform.

18. The computer program product according to claim 16, wherein the operations further comprise:

determining a current operating condition of the O-Cloud platform resource;

identifying that a prior operating condition of the O-Cloud platform resource matches the current operating condition of the O-Cloud platform resource;

identifying an operational setting of the O-Cloud platform resource that was implemented in response to the prior operating condition; and implementing the operational setting to be applicable to the O-Cloud platform resource while the current operating condition remains.

19. The computer program product according to claim 16, wherein the operations further comprise:

determining content of a workload to be serviced on the O-Cloud platform;

determining, based on the content of the workload, the workload is to be serviced by the O-Cloud platform resource;

generating the cApp in response to determining the workload is to be serviced by the O-Cloud platform resource; and transmitting the workload and the cApp to the O-Cloud platform resource to facilitate servicing of the workload using the O-Cloud platform resource.

20. The computer program product according to claim 16, wherein the operations further comprise:

generating the cApp in response to content received in one of an xApp received from a near-real time RAN intelligent controller (RIC) or an rApp received from a non-real time RIC; and implementing the cApp using the O-Cloud platform resource, wherein the O-Cloud platform resource is one of a compute resource, a storage resource, or a network resource.

* * * * *